United States Patent
Numata et al.

(10) Patent No.: US 6,603,724 B1
(45) Date of Patent: Aug. 5, 2003

(54) DISK RECORDING AND/OR REPRODUCING DEVICE, DISK LOADING MECHANISM, AND DISK EJECT MECHANISM

(75) Inventors: Koichi Numata, Tokyo (JP); Ryuzo Tamayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 519 days.

(21) Appl. No.: 09/604,931

(22) Filed: Jun. 28, 2000

(30) Foreign Application Priority Data

Jun. 30, 1999 (JP) .......................................... 11-186817

(51) Int. Cl.$^7$ ............................................... G11B 17/04
(52) U.S. Cl. ...................................................... 369/77.1
(58) Field of Search .............................. 369/77.1, 77.2, 369/75.1, 75.2, 270, 271

(56) References Cited

U.S. PATENT DOCUMENTS 4,340,952 A * 7/1982 Ikedo ........................ 369/75.2
6,134,212 A * 10/2000 Pines et al. ............... 369/30.85
6,208,607 B1 * 3/2001 Ida et al. .................... 369/77.1
6,295,266 B1 * 9/2001 Lee et al. ................... 369/77.1
6,392,980 B1 * 5/2002 Sato et al. ................... 369/192

* cited by examiner

Primary Examiner—William Korzuch
Assistant Examiner—Angel Castro
(74) Attorney, Agent, or Firm—Jay H. Maioli

(57) ABSTRACT

A disk recording and/or reproducing device capable of recording data onto a disk and/or reproducing data recorded on the disk, includes a disk mounting portion for mounting the disk; a chucking portion for chucking the disk in cooperation with the disk mounting portion, the chucking portion having a disk engaging portion for engaging the disk at the start of disk loading; and a slider for supporting the chucking portion and moving the chucking portion in a radial direction of the disk between a chucking position where the disk is allowed to be chucked and a loading position where the disk loading is allowed to be started. With this arrangement, the device can be reduced in thickness.

16 Claims, 26 Drawing Sheets

F I G. 4
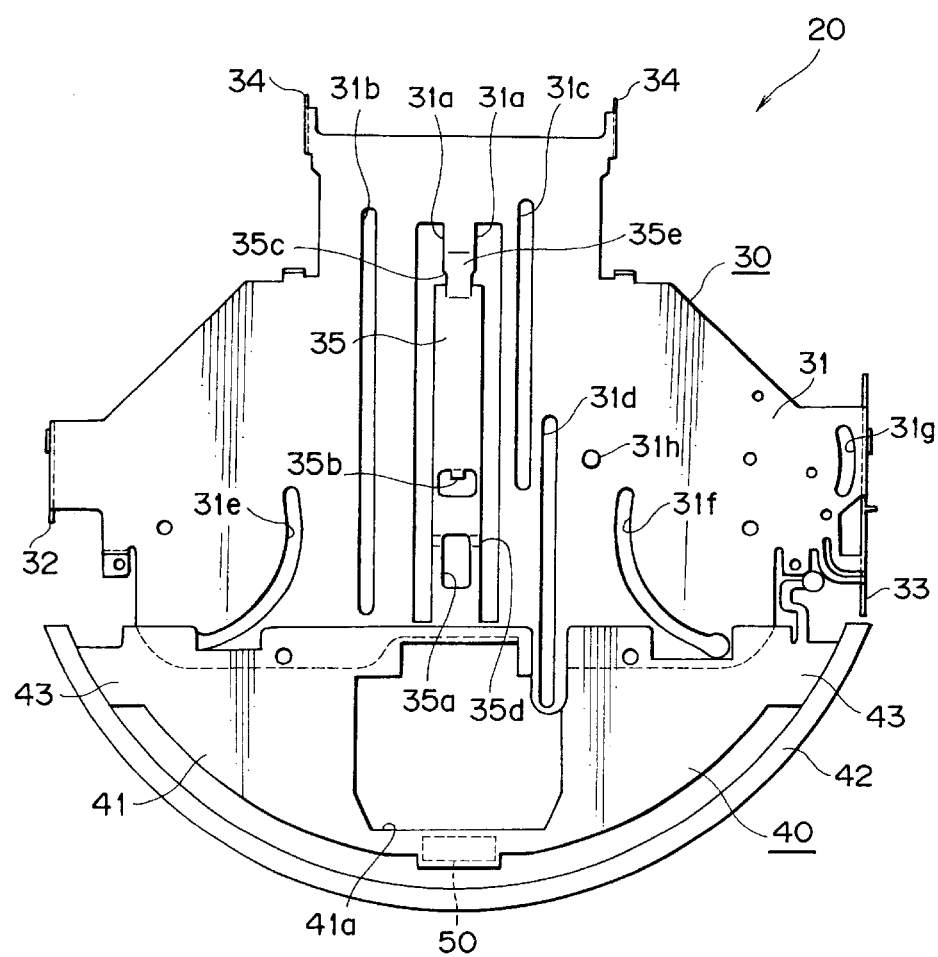

F I G. 10
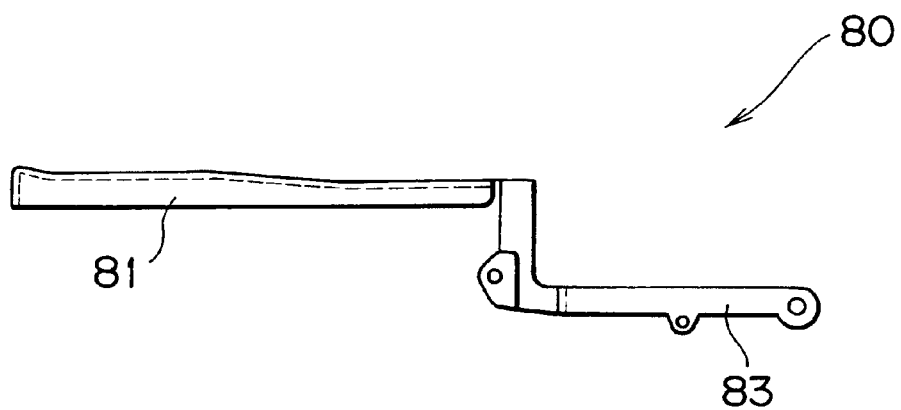

F I G. 17
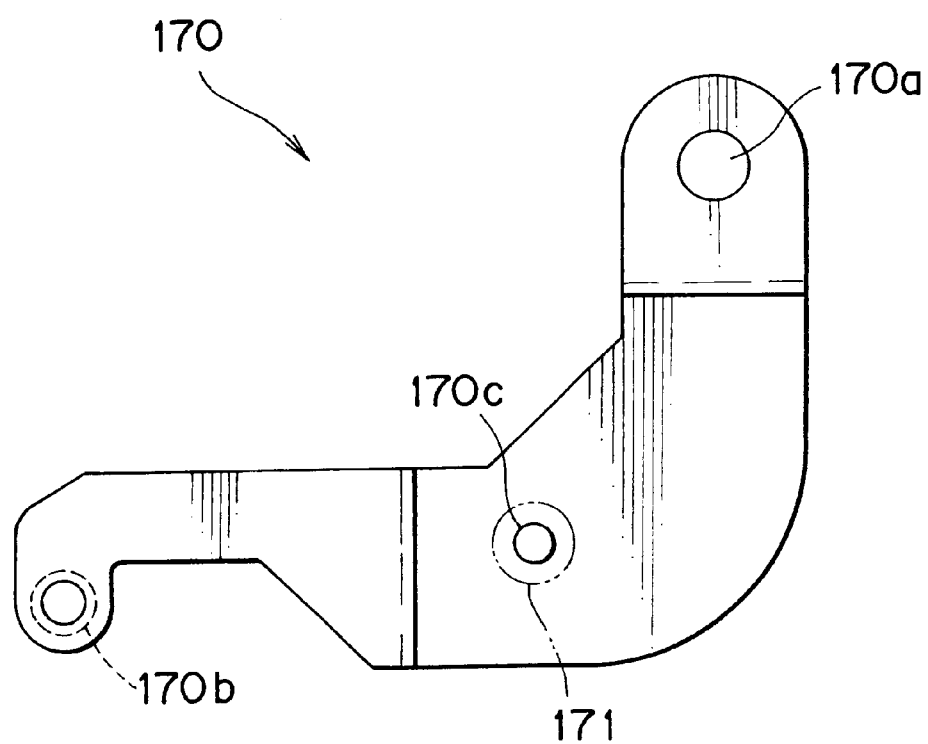

DISK RECORDING AND/OR REPRODUCING DEVICE, DISK LOADING MECHANISM, AND DISK EJECT MECHANISM

BACKGROUND OF THE INVENTION

The present invention relates to a disk recording and/or reproducing device, a disk loading mechanism, and a disk eject mechanism, and more particularly to a disk recording and/or reproducing device for recording and/or reproducing a signal with respect to a disk, a disk loading mechanism for loading a disk on a disk mounting portion, and a disk eject mechanism for ejecting a disk mounted on the disk mounting portion.

Conventionally known is a disk recording and/or reproducing device capable of either recording or reproducing a signal, or both recording and reproducing a signal with respect to a disk.

Such a known disk recording and/or reproducing device usually includes a disk table adapted to be rotated by a drive force of a spindle motor and a chucking plate opposed to the disk table. When a disk having a center hole is inserted from a disk insert/eject slot formed through a housing of the disk recording and/or reproducing device, the disk is drawn into the housing by a loading mechanism until the center hole of the disk reaches a position corresponding to the disk table. In this condition, the disk table or the chucking plate is raised or lowered by a lift mechanism, thereby chucking the disk between the disk table and the chucking plate.

In the conventional disk recording and/or reproducing device, the housing is partially formed of a transparent material or provided with a window allowing the disk mounted on the disk table to be visibly recognized from the outside of the housing, so that the presence or absence of the disk in the housing can be visibly recognized from the outside of the housing.

The disk loaded in the housing is ejected by an eject mechanism provided in the housing. In the conventional disk recording and/or reproducing device, the disk is inserted to a given position into the housing upon disk loading, and the disk is thereafter drawn into a chucking position by a spring force of biasing the disk in a loading direction. Conversely, upon disk ejection, the disk is first moved to the given position in an eject direction, and is thereafter ejected from the housing by a spring force of biasing the disk in the eject direction. To exert such biasing forces having opposite directions with a reduced number of parts, the device may employ a toggle spring adapted to be reversed in its direction of biasing force at the time the disk reaches the above given position.

In the eject operation, the direction of biasing force of the toggle spring is reversed usually when the disk is moved to the above given position by an eject lever, and the disk is thereafter ejected by the toggle spring rather than by the eject lever.

In the above conventional disk recording and/or reproducing device with the chucking plate opposed to the disk table, a support portion for supporting the chucking plate is provided axially of the chucking plate. Accordingly, the thickness of the disk recording and/or reproducing device is large, causing a hindrance to a reduction in thickness of the disk recording and/or reproducing device.

Further, before the chucking operation by the disk table and the chucking plate is started in the condition where the disk is located at the chucking position, the disk is not yet engaged with the disk table and the chucking plate. Accordingly, in the event that there occurs misalignment of the disk located at the chucking position due to vibrations or the like, the chucking operation may not be properly performed.

Further, in the above conventional disk recording and/or reproducing device, the housing is partially formed of a transparent material or the window is provided at a part of the housing to allow the disk to be visibly recognized from the outside of the housing, in order to determine whether or not the disk is present in the housing. However, since the surface of the disk is flat and smooth, it is difficult to easily determine whether what is visibly recognized from the outside is the disk or a part of the inside structure in the housing. Thus, there is a possibility of erroneous determination of the presence or absence of the disk in the housing.

Further, in the above conventional disk recording and/or reproducing device employing the toggle spring to eject the disk, a sufficient space for movement of the eject lever cannot be ensured because of limitation of installation space inside the housing, for example. Accordingly, there is a case that it is difficult to design the eject mechanism so as to reliably move the disk to the above given position in the eject direction.

In addition, the toggle spring has a so-called dead band causing the inversion of the direction of the biasing force. However, there is a possibility that the dead band of the toggle spring may vary because of aging or the like, causing a problem such that although the disk is moved to the given position, the toggle spring is not inverted and the disk is therefore not ejected.

SUMMARY OF THE INVENTION

It is an object of the present invention to provide a disk recording and/or reproducing device which can solve the above problems.

In accordance with the present invention, there is provided a disk recording and/or reproducing device capable of recording data onto a disk and/or reproducing data recorded on said disk, comprising a disk mounting portion for mounting said disk; a chucking portion for chucking said disk in cooperation with said disk mounting portion, said chucking portion having a disk engaging portion for engaging said disk at starting disk loading; and a slider for supporting said chucking portion and moving said chucking portion in a radial direction of said disk between a chucking position where said disk is allowed to be chucked and a loading position where said disk loading is allowed to be started.

BRIEF DESCRIPTION OF THE DRAWINGS

FIG. 4 is a schematic plan view showing a support base;

FIG. 10 is a side view of the shutter member;

FIG. 17 is an enlarged plan view showing a link lever;

DETAILED DESCRIPTION OF THE PREFERRED EMBODIMENTS

Figure 1:
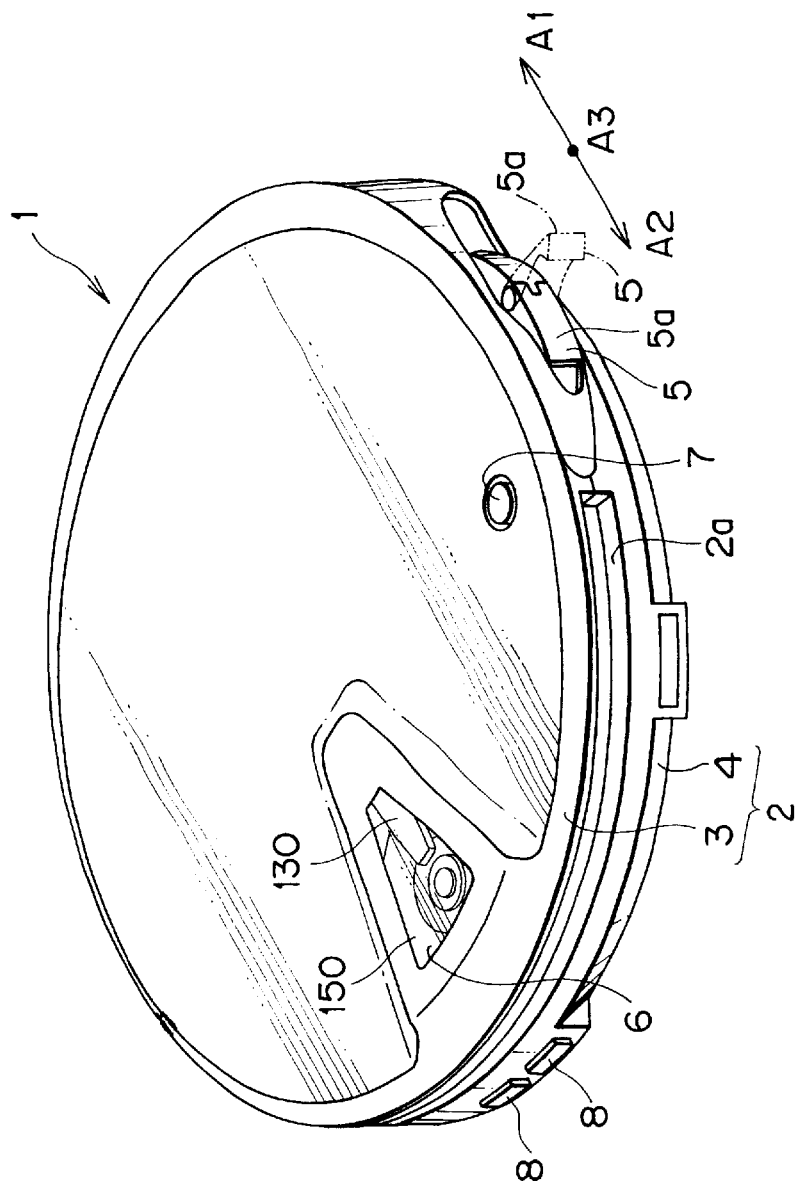
FIG. 1 is a perspective view of a disk recording and/or reproducing device according to a preferred embodiment of the present invention in the condition where no disk is inserted.

A preferred embodiment of the present invention will now be described with reference to the attached drawings. The disk recording and/or reproducing device described in the following preferred embodiment is a portable reproducing device for reproducing a signal recorded on a compact disc used as the disk.

Reference numeral 1 generally denotes a disk recording and/or reproducing device according to a preferred embodiment of the present invention. The disk recording and/or reproducing device 1 has a housing 2 in which various required members and mechanisms are provided (see FIGS. 1 to 3).

The housing 2 is composed generally of an upper portion 3 and a lower portion 4 joined together. The external shape of the housing 2 is substantially circular and flattened. The housing 2 has a front surface formed with a disk insert/eject slot 2a, and has a side surface provided with a sliding knob 5 slidable in opposite directions depicted by double-headed arrows A1–A2 in FIGS. 1 to 3. The sliding knob 5 has a pivotable portion 5a adapted to be pivotably projected outward for the purpose of easy operation.

The upper portion 3 of the housing 2 has an upper surface formed with a window 6 near the front end. The window 6 is formed of a transparent material, so that a part of the inside of the housing 2 is visible through the window 6. The upper surface of the upper portion 3 is also provided with a push button 7 near the sliding knob 5. The lower portion 4 of the housing 2 is provided with various operating switches 8 circumferentially spaced apart from each other.

Figure 3:
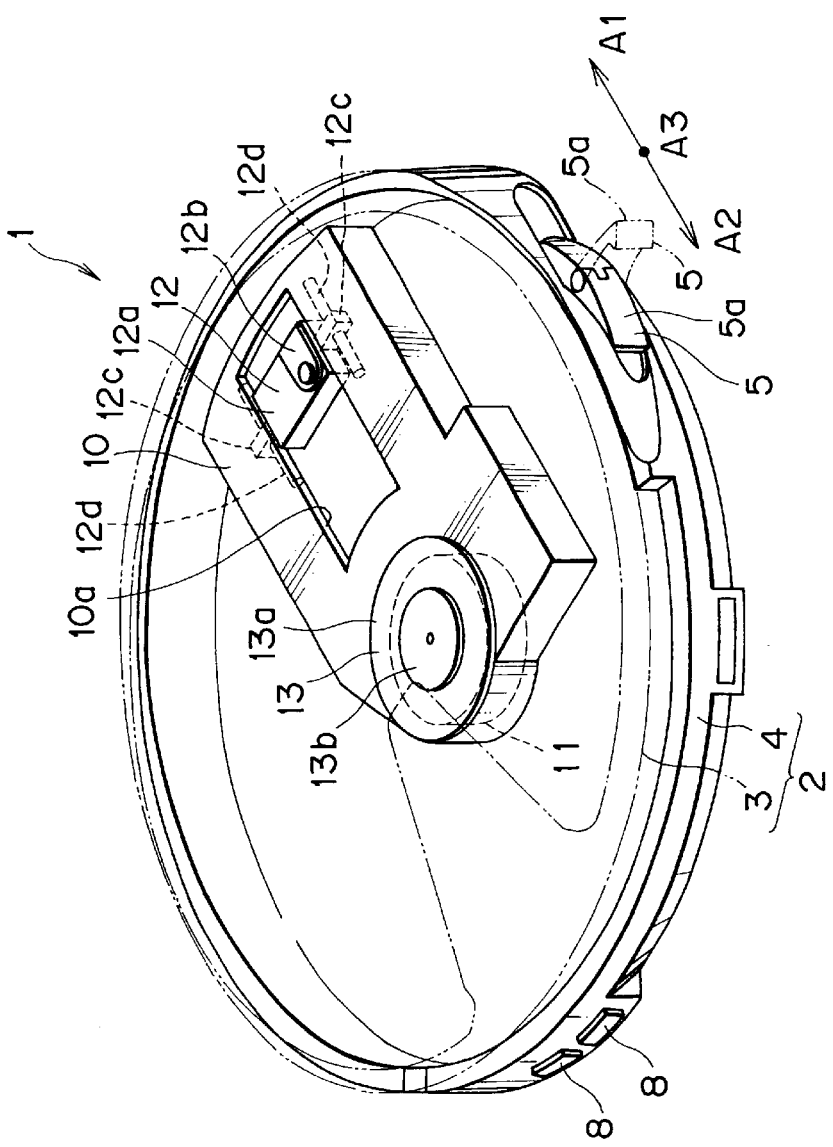
FIG. 3 is a view similar to FIG. 1, showing an inner case, a disk table, and an optical pickup both provided in the inner case.

As shown in FIG. 3, an inner case 10 is supported through a damper (not shown) on an inner bottom surface of the lower portion 4, and a spindle motor 11 and an optical pickup 12 are provided in the inner case 10.

The spindle motor 11 is located at one end portion of the inner case 10, and a motor shaft of the spindle motor 11 projects upward from the inner case 10. A disk table 13 serving as the disk mounting portion in the present invention is fixed to the upper end of the motor shaft of the spindle motor 11.

The disk table 13 is circular in external shape, and it is located at a substantially central portion of the lower portion 4. The disk table 13 is composed of an annular portion 13a and a centering portion 13b projecting upward from a central portion of the annular portion 13a. A magnet (not shown) is embedded in the disk table 13.

The inner case 10 is formed with an upper opening 10a, and the optical pickup 12 is movably supported so as to be exposed to the upper opening 10a. The optical pickup 12 has a moving base 12a and a biaxial actuator 12b supported on the moving base 12a. A pair of bearing portions 12c are provided on the opposite ends of the moving base 12a. The bearing portions 12c are slidably supported to a pair of guide shafts 12d. By rotating a feed screw (not shown), for example, the optical pickup 12 is moved in a radial direction of a disk mounted on the disk table 13.

A support base 20 is provided in the housing 2 on the upper side. As shown in FIG. 4, the support base 20 is composed of a support plate 30 and a front plate 40 joined together.

Figure 5:
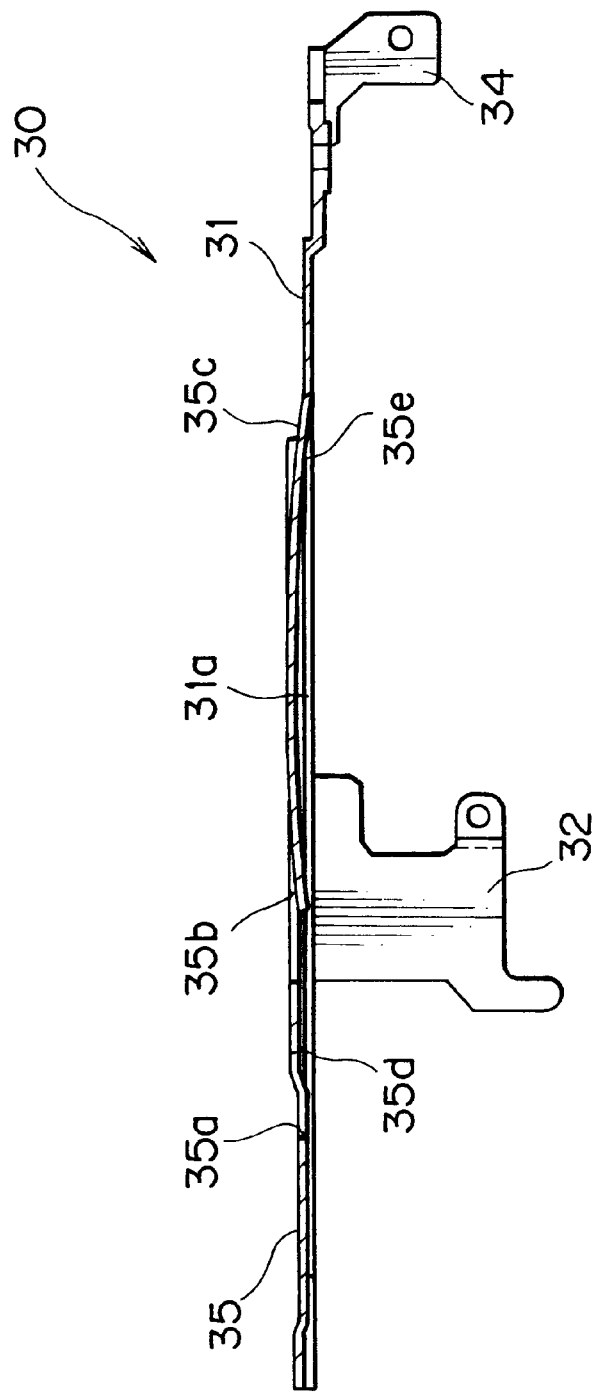
FIG. 5 is a schematic longitudinally sectional view showing a support plate.

As shown in FIGS. 4 and 5, the support plate 30 is integrally formed with a top plate portion 31, left and right side portions 32 and 33 projecting downward from the opposite side edges of the top plate portion 31, and a pair of support portions 34 projecting downward from the rear end of the top plate portion 31. The support portions 34 are laterally spaced apart from each other.

A pair of left and right escape holes 31a are formed at a laterally central portion of the top plate portion 31. The escape holes 31a extend longitudinally of the top plate portion 31 and are laterally spaced apart from each other.

A first guide hole 31b is formed at a left portion of the top plate portion 31 on the left side of the left escape hole 31a. The first guide hole 31b extends longitudinally of the top plate portion 31, and has substantially the same length as that of the left escape hole 31a. A second guide hole 31c is formed at a right portion of the top plate portion 31 on the right side of the right escape hole 31a. The second guide hole 31c extends longitudinally of the top plate portion 31 from a position corresponding to a central portion of the right escape hole 31a to a position corresponding to the rear end of the right escape hole 31a. A third guide hole 31d is formed at the right portion of the top plate portion 31 on the right side of the second guide hole 31c. The third guide hole 31d extends longitudinally of the top plate portion 31 from a position corresponding to the central portion of each escape hole 31a to a position before the front end of each escape hole 31a.

A pair of left and right arcuate guide holes 31e and 31f are formed at a front portion of the top plate portion 31. The left guide hole 31e is located on the left side of the first guide hole 31b, and the right guide hole 31f is located on the right side of the third guide hole 31d. The guide holes 31e and 31f are curved laterally outward from the central portion of the top plate portion 31 toward the front end thereof. Further, a slightly arcuate insertion hole 31g is formed at a right end portion of the top plate portion 31.

A longitudinally extending portion 35 is formed between the two escape holes 31a of the top plate portion 31, and a sensor escape hole 35a is formed through the longitudinally extending portion 35 near its front end. A stopper tab 35b is formed at a central portion of the longitudinally extending portion 35 on the rear side of the sensor escape hole 35a. The stopper tab 35b projects slantwise downward toward the front side of the longitudinally extending portion 35. The longitudinally extending portion 35 has a narrow rear end portion 35c having a width smaller than the width of the other portion.

A first inclined portion 35d is formed near the rear end of the sensor escape hole 35a. The first inclined portion 35d is slightly inclined upward toward the rear side of the longitudinally extending portion 35. Further, a second inclined portion 35e is formed as a front half portion of the narrow portion 35c of the longitudinally extending portion 35. The second inclined portion 35e is slightly inclined upward toward the front side of the longitudinally extending portion 35. Accordingly, a portion between the rear end of the first inclined portion 35d and the front end of the second inclined portion 35e of the longitudinally extending portion 35 is slightly raised from the other portion.

As shown in FIG. 4, the front plate 40 is integrally formed with a main portion 41, an arcuate portion 42, and a pair of joint portions 43. The main portion 41 has a segmental shape such that the rear edge extends substantially straight in the lateral direction and the front edge continuous to the opposite ends of the rear edge is substantially arcuate so as to be convexed toward the front side. A plate exposure hole 41a is formed at a laterally central portion of the main portion 41. A first magnet 50 is mounted on the lower surface of the main portion 41 at its front end portion.

The joint portions 43 are formed near the opposite ends of the arcuate portion 42, and the arcuate portion 42 is joined through the joint portions 43 to the front edge of the main portion 41. The rear end portion of the main portion 41 of the front plate 40 is mounted on the front end portion of the support plate 30.

Figure 6:
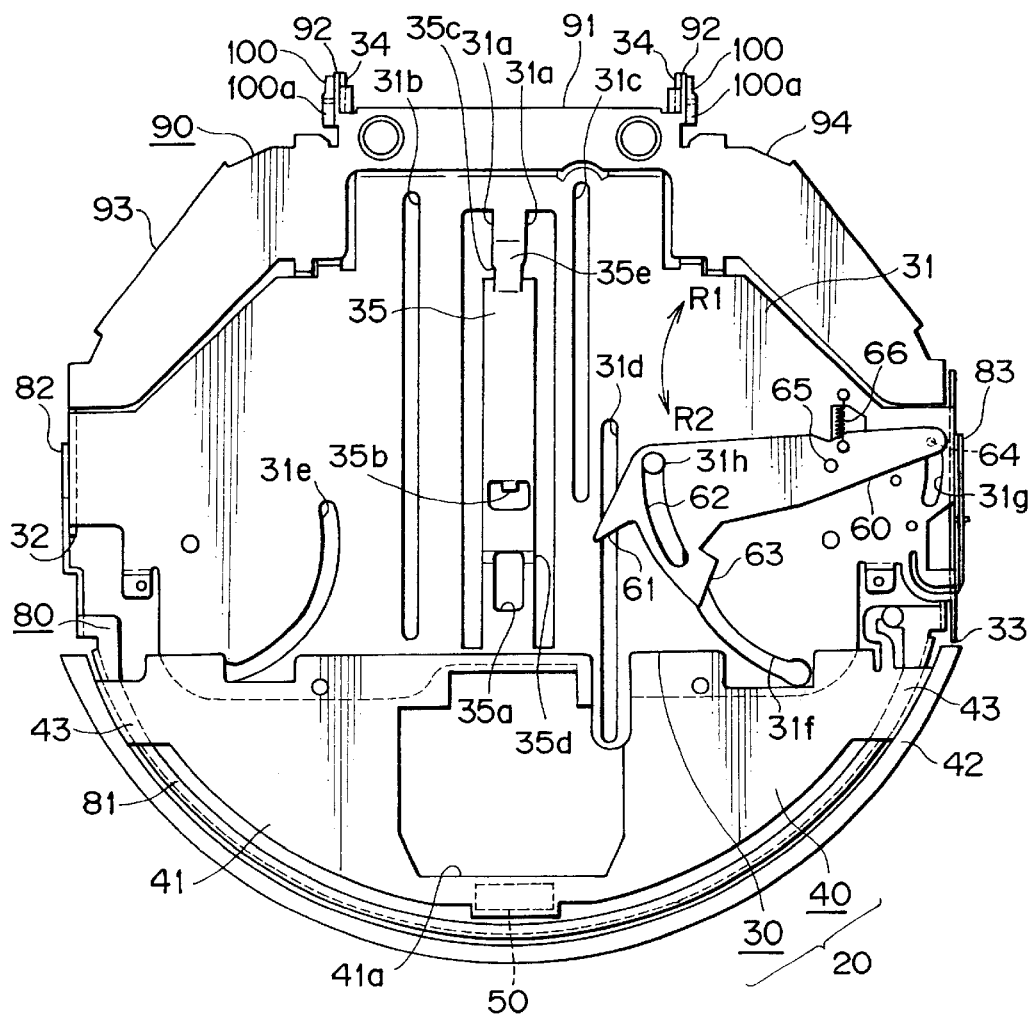
FIG. 6 is a schematic plan view showing the support base, a holder, and an eject lever.

As shown in FIG. 6, an eject lever 60 is pivotably supported to the upper surface of the top plate portion 31 of the support plate 30 at its right portion. The eject lever 60 is formed at its one end with a first push portion 61 projecting substantially leftward. An arcuate guided hole 62 is formed near the first push portion 61, and a support shaft 31h provided on the top plate portion 31 is inserted through the guided hole 62. A second push portion 63 projects substantially frontward from the front edge of the eject lever 60 at a portion near the guided hole 62.

An operated shaft 64 is formed at the other end portion of the eject lever 60 so as to project downward, and a fulcrum 65 is formed at an intermediate portion of the eject lever 60 so that the distance between the fulcrum 65 and the operated shaft 64 is shorter than the distance between the fulcrum 65 and the guided hole 62. Further, the distance between the fulcrum 65 and the second push portion 63 is shorter than the distance between the fulcrum 65 and the first push portion 61. An extension spring 66 is connected between the eject lever 60 at a position near the fulcrum 65 and a part of the top plate portion 31, so as to apply a biasing force to the eject lever 60 in such a direction that the first push portion 61 is moved substantially frontward. The eject lever 60 is pivotably moved about the fulcrum 65 as being guided by the support shaft 31h inserted in the guided hole 62. The range of the pivotable movement of the eject lever 60 is determined by the length of the guided hole 62 between its opposite ends coming into abutment against the support shaft 31h.

Figure 7:
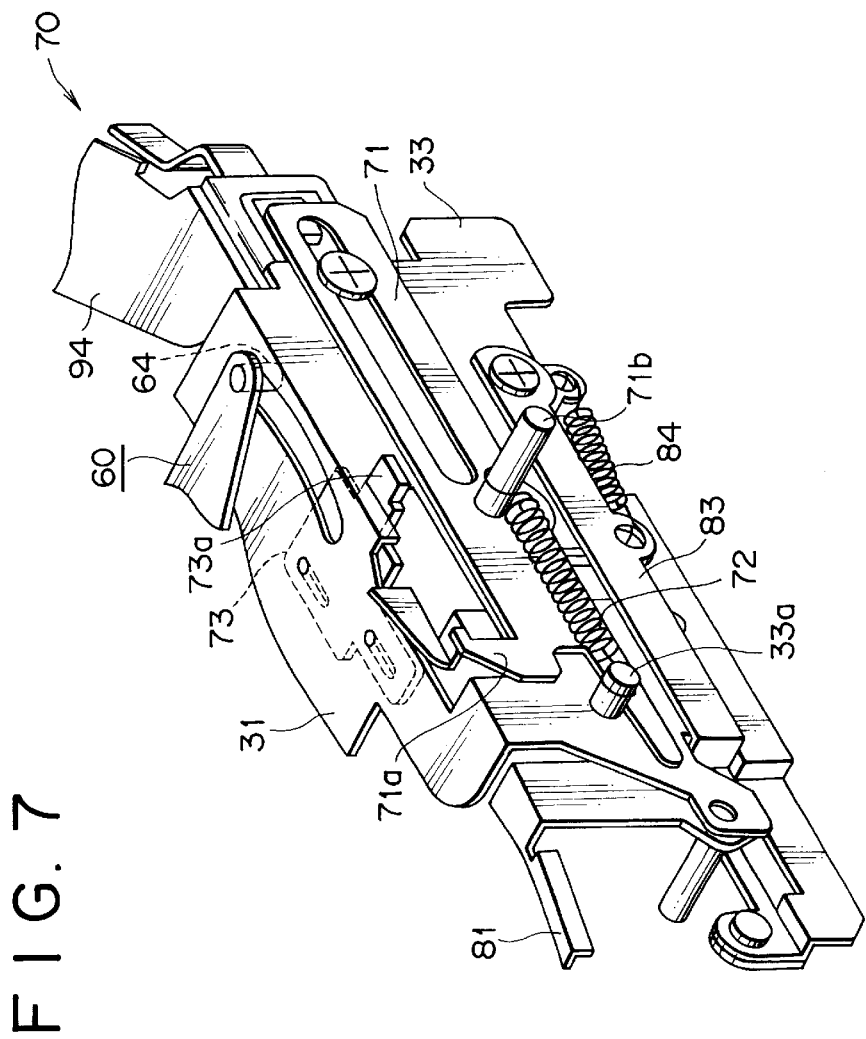
FIG. 7 is a schematic enlarged perspective view showing an operating mechanism.

As shown in FIG. 7, various members of an operating mechanism 70 are supported to the top plate portion 31 and the right side portion 33 of the support plate 30.

An operating lever 71 as a component of the operating mechanism 70 is longitudinally movably supported to the right side portion 33. The operating lever 71 is formed at its front end with a push portion 71a projecting upward. Further, a shaft portion 71b is formed at a longitudinally central portion of the operating lever 71 so as to project laterally outward. The sliding knob 5 (see FIGS. 1 to 3) is mounted on the shaft portion 71b, so that when the sliding knob 5 is operated by an operator, the operating lever 71 is moved in the longitudinal direction. A spring retainer pin 33a is formed on the right side portion 33 at a position near its front end, and a return spring 72 is connected between the shaft portion 71b of the operating lever 71 and the spring retainer pin 33a of the right side portion 33, so as to bias the operating lever 71 frontward.

An interposed lever 73 as a component of the operating mechanism 70 is longitudinally movably supported to the lower surface of the top plate portion 31 at a position near the right side portion 33. The interposed lever 73 is formed with a pushed portion 73a projecting laterally outward from the right side portion 33. When the operating lever 71 is moved rearward in the condition where the operated shaft 64 of the eject lever 60 is located at the front end of the insertion hole 31g, the pushed portion 73a of the interposed lever 73 is pushed rearward by the push portion 71a of the operating lever 71, and the operated shaft 64 is accordingly pushed rearward by the rear end of the interposed lever 73. As a result, the eject lever 60 is pivotally moved about the fulcrum 65 in a direction shown by an arrow R2 in FIG. 6.

Figure 8:
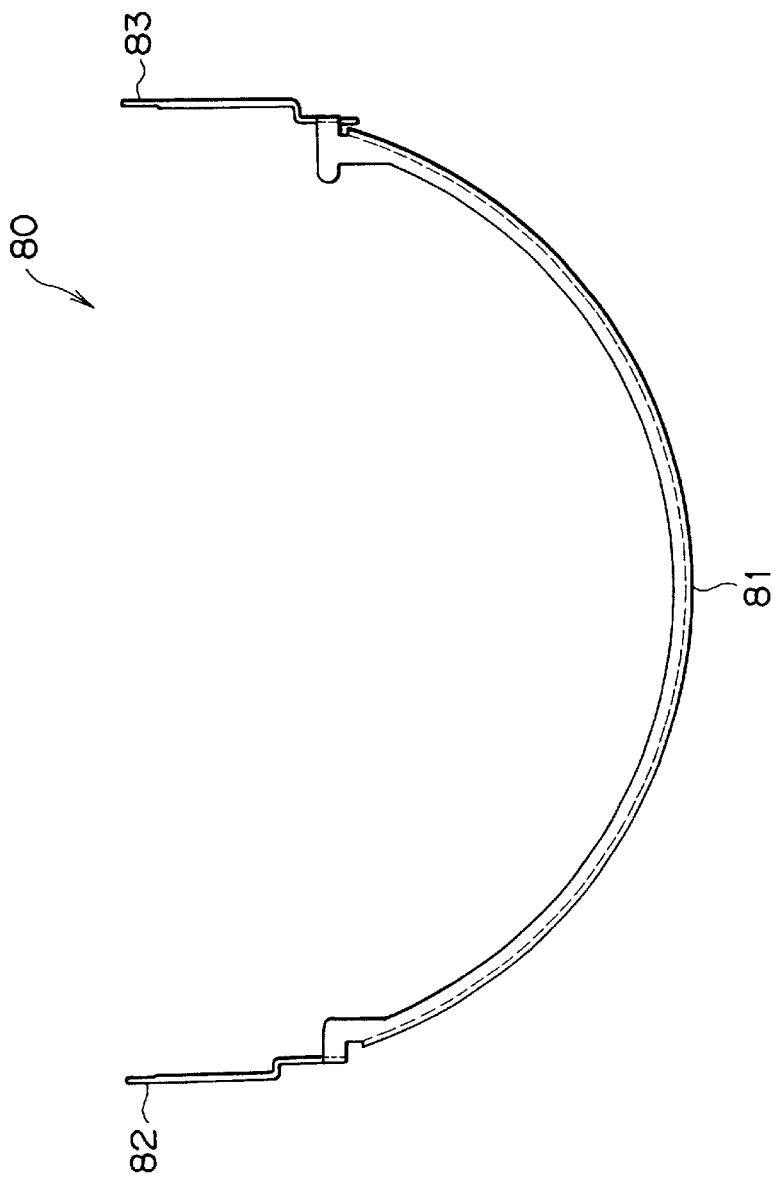
FIG. 8 is a plan view showing a shutter member.
Figure 9:
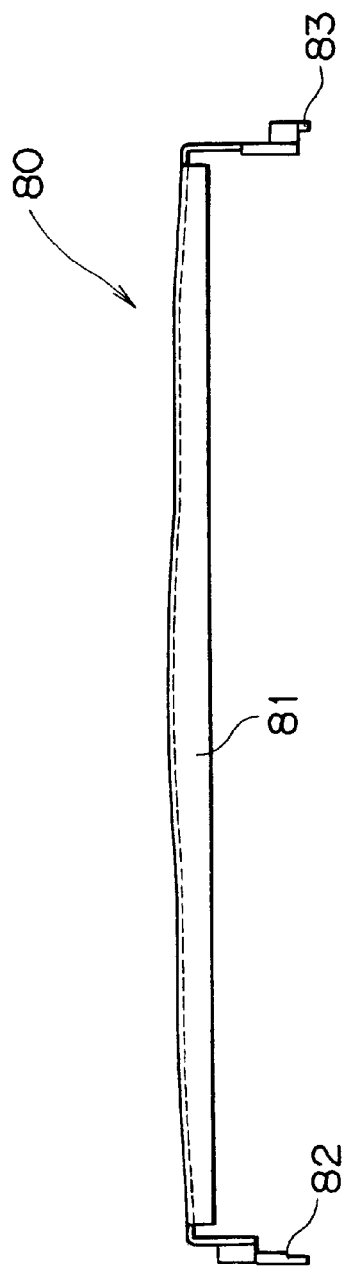
FIG. 9 is a front elevation of the shutter member.

Referring to FIGS. 8 to 10, there is shown a shutter member 80. The shutter member 80 is integrally formed with an arcuate closing portion 81 and a pair of left and right supported portions 82 and 83 continuing to the opposite ends of the closing portion 81. The left supported portion 82 is pivotally supported at its front end to the left side portion 32 of the support plate 30, and the right supported portion 83 is pivotably supported at its front end to the right side portion 33 of the support plate 30. As shown in FIG. 7, an extension coil spring 84 is connected between a lower end portion of the right side portion 33 and the right supported portion 83 supported to the right side portion 33, so as to bias the shutter member 80 downward, i.e., in such a direction that the disk insert/eject slot 2a of the housing 2 is closed by the shutter member 80.

Figure 11:
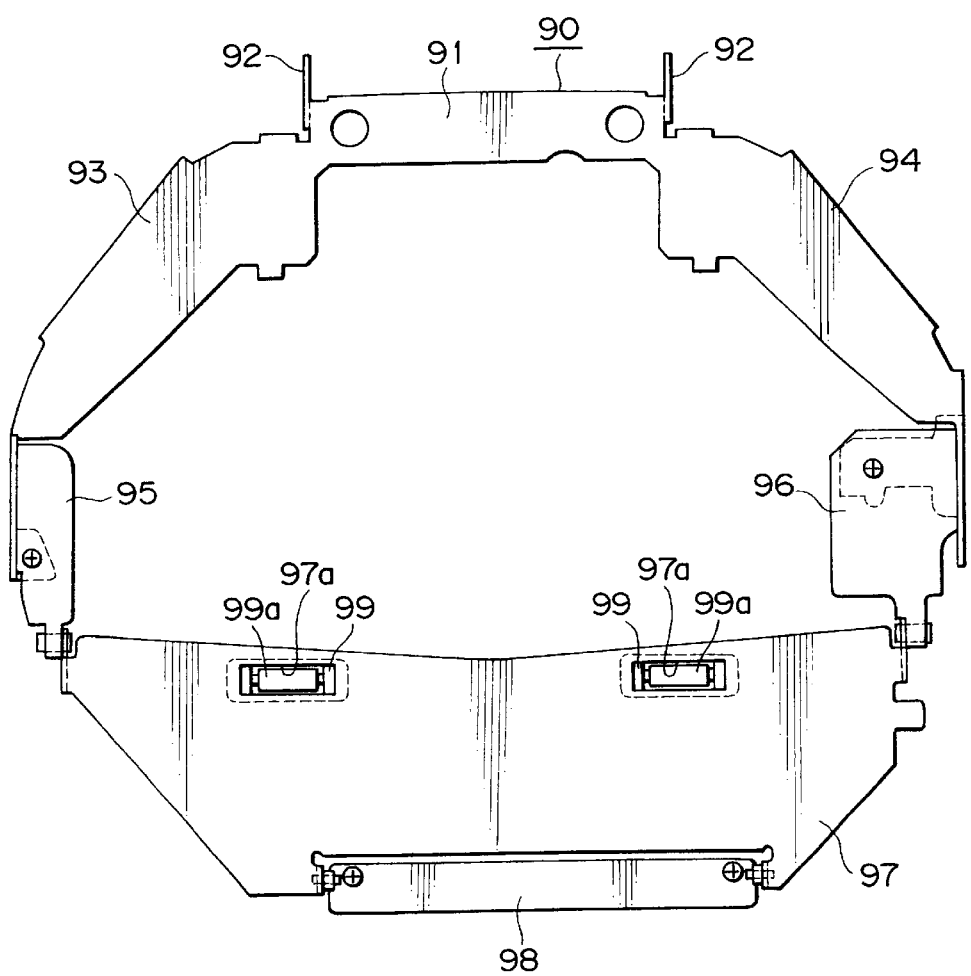
FIG. 11 is a schematic plan view showing the holder and required members provided below the support base.

Referring to FIGS. 6 and 11, there is shown a holder 90. The holder 90 is integrally formed with a base portion 91, a pair of left and right supported portions 92, and a pair of left and right extended portions 93 and 94.

The base portion 91 extends laterally and is positioned on the rear end portion of the top plate portion 31 of the support plate 30. The left and right supported portions 92 project downward from the left and right ends of the base portion 91 at its rear portion, and are pivotably supported to the left and right support portions 34 of the support plate 30, respectively. The left and right extended portions 93 and 94 project obliquely frontward from the left and right ends of the base portion 91 at its front portion so as to be spaced divergently apart from each other. As shown in FIG. 11, a first support member 95 and a second support member 96 are mounted on the front ends of the extended portions 93 and 94, respectively.

A lift member 97 is pivotably supported at its left and right rear ends to the first support member 95 and the second support member 96. A retainer 98 is fixed to the inner bottom surface of the lower portion 4 of the housing 2. The lift member 97 is pivotably supported at its left and right front ends to the left and right ends of the retainer 98. Accordingly, when the holder 90 is pivotally moved, the first support member 95 and the second support member 96 are synchronously raised or lowered in accordance with the pivotal movement of the holder 90, so that the lift member 97 is pivotally moved in such a manner that its rear end is raised or lowered.

The lift member 97 is a platelike member, and it is formed with a pair of roller support holes 97a laterally spaced apart from each other. A pair of rollers 99a are rotatably supported through roller support members 99 in the roller support holes 97a.

The second support member 96 located on the right side is provided with an interlocking mechanism (not shown). The interlocking mechanism is operated by the operation of the operating mechanism 70 to thereby pivotally move the holder 90. Accordingly, the first and second support members 95 and 96 are raised or lowered, and the lift member 97 is pivotally moved.

Figure 19:
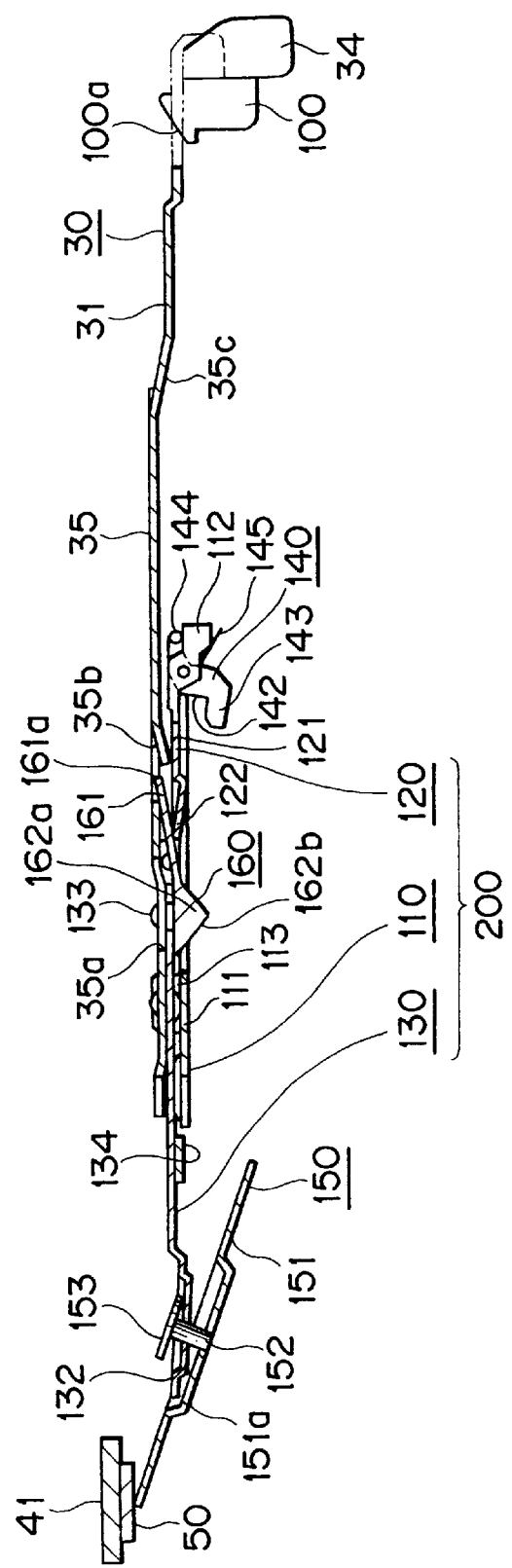
FIG. 19 is a longitudinally sectional view of the device shown in FIG. 18.

As shown in FIGS. 6 and 19, a pair of release members 100 are mounted on the outer surfaces of the supported portions 92 of the holder 90. Each of the release members 100 is formed with an inclined surface 100a inclined downward toward the front side.

Figure 12:
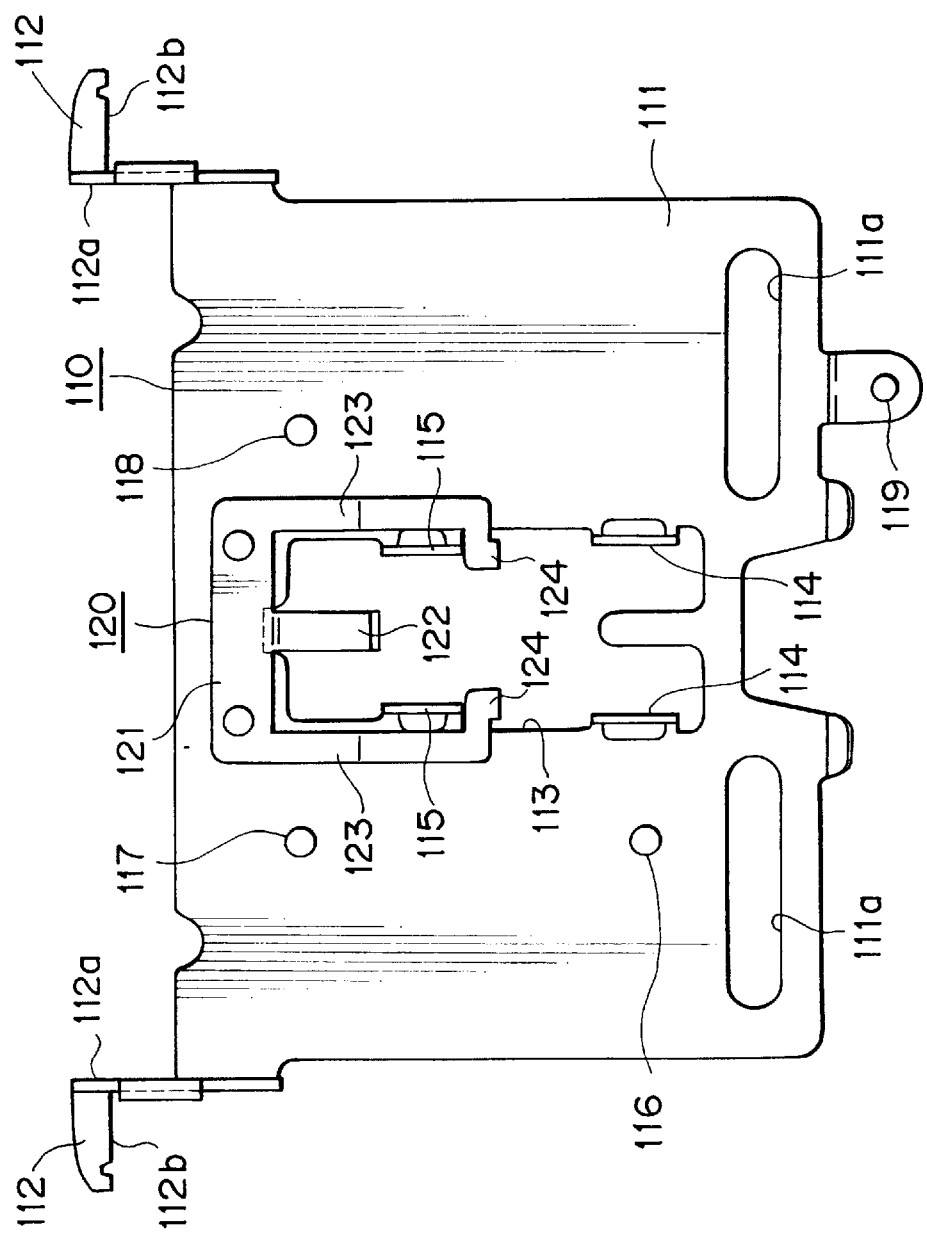
FIG. 12 is a schematic enlarged plan view showing a slide member and a leaf spring member mounted on the slide member.
Figure 13:
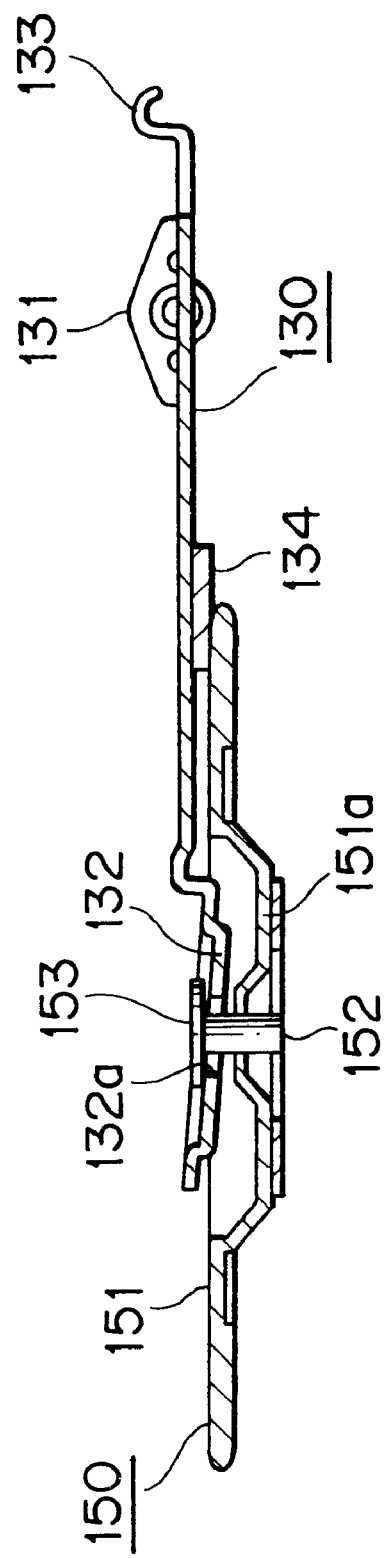
FIG. 13 is an enlarged longitudinally sectional view showing a plate support member and a chucking plate supported to the plate support member.
Figure 18:
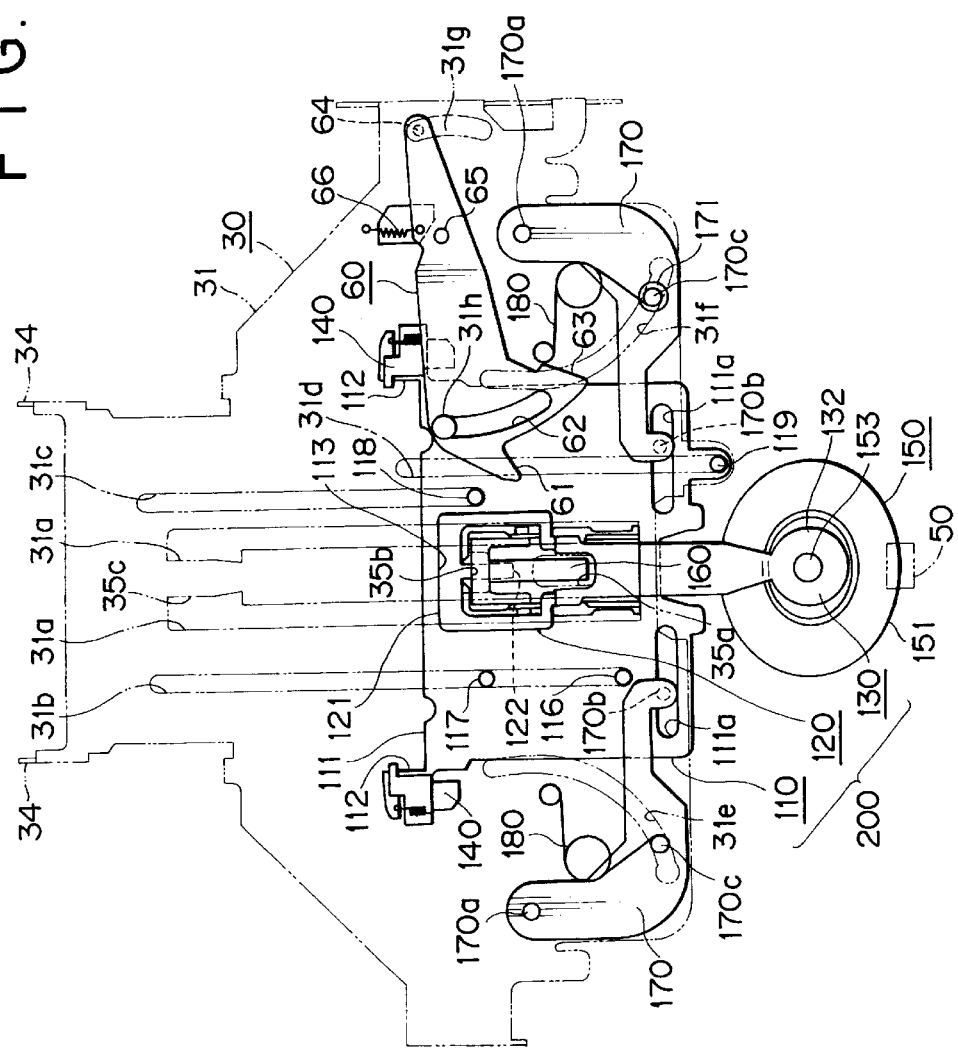
FIG. 18 is a plan view showing the operation of the disk recording and/or reproducing device shown in FIG. 1 in the condition where no disk is inserted.

As shown in FIGS. 12, 13, and 18, a support slider 200 is longitudinally slidably supported to the lower surface of the top plate portion 31 of the support plate 30. The support slider 200 is composed of a slide member 110, a leaf spring member 120 mounted on the slide member 110, and a plate support member 130 pivotably supported to the slide member 110.

As shown in FIG. 12, the slide member 110 is integrally formed with a substantially rectangular main portion 111 and a pair of support/engage portions 112 projecting from the opposite side edges of the main portion 111 at its rear end.

A pair of laterally extending slide holes 111a are formed at a front end portion of the main portion 111 so as to be laterally spaced apart from each other. An opening 113 is formed at a laterally central portion of the main portion 111. A pair of first support portions 114 and a pair of second support portions 115 are formed at the peripheral edge of the opening 113. The first support portions 114 are located near the front end of the opening 113 so as to be laterally opposed to each other, and the second support portions 115 are located near the rear end of the opening 113 so as to be laterally opposed to each other.

Four supported shafts 116, 117, 118, and 119 project upward from the main portion 111. The supported shafts 116 and 117 are located on the left side of the opening 113 so as to be longitudinally spaced apart from each other. The supported shaft 118 is located on the right side of the opening 113 near the rear end of the main portion 111. The supported shaft 119 is located on the right side of the supported shaft 118 at the front end of the main portion 111. The supported shafts 116 and 117 are slidably supported in the first guide hole 31b of the support plate 30. The supported shaft 118 is slidably supported in the second guide hole 31c of the support plate 30. The supported shaft 119 is slidably supported in the third guide hole 31d of the support plate 30. The supported shaft 119 serves as a pushed portion to be pushed by the first push portion 61 of the eject lever 60 in an eject operation.

Figure 14:
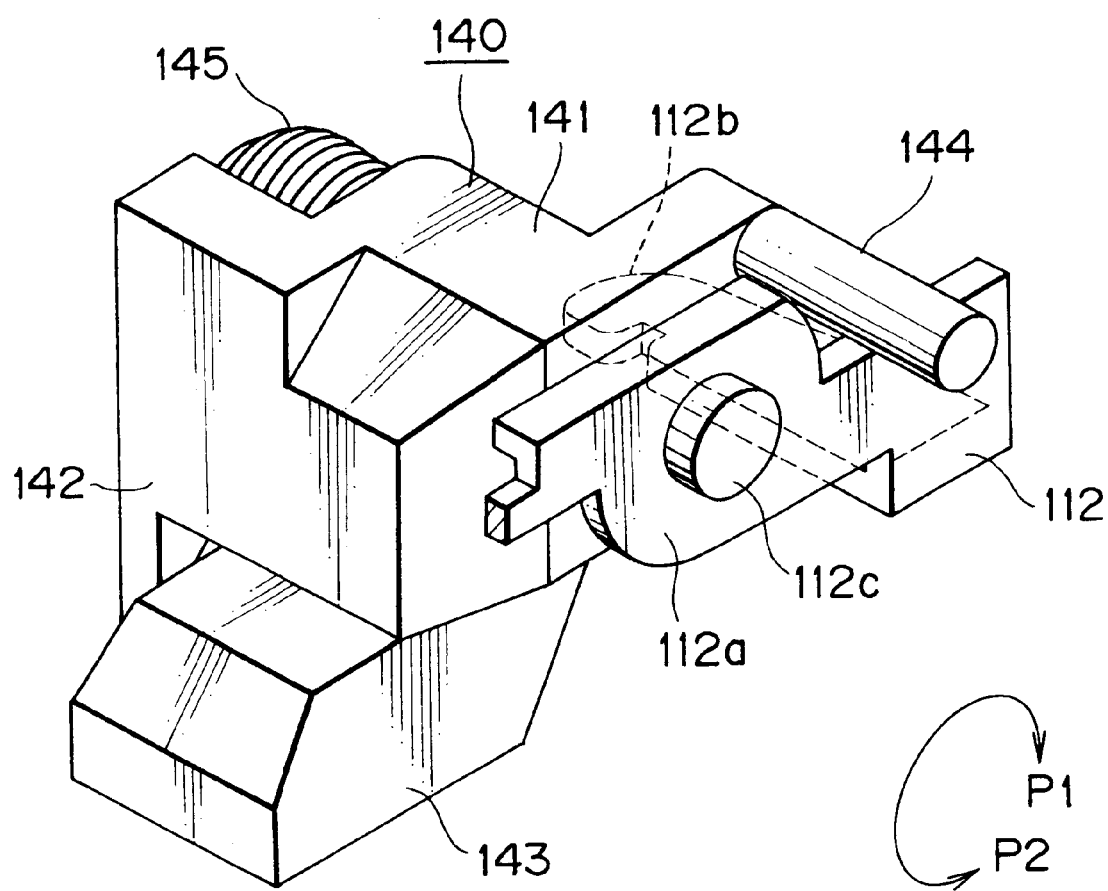
FIG. 14 is a schematic enlarged perspective view showing a holding member supported to a support/engage portion of the slide member.

Each of the support/engage portions 112 is composed of a support portion 112a continuing to the main portion 111 and projecting rearward, and a spring retainer portion 112b projecting laterally outward from the support portion 112a. As shown in FIG. 14, each support portion 112a is provided with a support shaft 112c projecting laterally outward, and a holding member 140 is pivotably supported to the support shaft 112c.

Each holding member 140 is integrally formed with a supported portion 141, a stopper portion 142 formed on the front side of the supported portion 141, a receiving portion 143 projecting frontward from the lower end of the stopper portion 142, and an elastic contact portion 144 projecting laterally inward from the supported portion 141. The supported portion 141 of each holding member 140 is pivotably supported to the corresponding support shaft 112c of the slide member 110. A torsion coil spring 145 is interposed between the stopper portion 142 of each holding member 140 and the corresponding spring retainer portion 112b of the slide member 110. Accordingly, a turning force having a direction shown by an arrow P1 in FIG. 14 is applied to each holding member 140 by the corresponding torsion coil spring 145, and the elastic contact portion 144 of each holding member 140 comes into elastic contact with the upper end of the corresponding support portion 112a of the slide member 110.

As shown in FIG. 12, the leaf spring member 120 is integrally formed with a base portion 121 having a substantially U-shape opening to the front side, a first spring portion 122 projecting frontward from the lateral center of the base portion 121, a pair of side portions 123 projecting frontward from the left and right ends of the base portion 121, and a pair of second spring portions 124 projecting laterally inward from the front ends of the side portions 123 so as to be opposed to each other. The base portion 121 of the leaf spring member 120 is mounted on the slide member 110 at a peripheral portion just behind the opening 113.

As shown in FIGS. 13 and 18, the plate support member 130 is a longitudinally elongated member, and a pair of supported portions 131 are formed near the rear end of the plate support member 130. The supported portions 131 of the plate support member 130 are pivotably supported to the first support portions 114 of the slide member 110, respectively. The plate support member 130 has a circular front end portion serving as a plate support portion 132. The plate support portion 132 has a central support hole 132a.

A rear end portion of the plate support member 130 on the rear side of the supported portions 131 is bifurcated, and a pair of spring contact portions 133 are formed at the bifurcated rear ends of the plate support member 130. The second spring portions 124 of the leaf spring member 120 are in elastic contact with the spring contact portions 133 of the plate support member 130 from the lower side thereof. Accordingly, a turning force having a direction of lowering the plate support portion 132 is applied to the plate support member 130 by the leaf spring member 120, and a portion of the plate support member 130 on the immediately front side of the supported portions 131 is in elastic contact with the front end portion of the slide member 110 from the upper side thereof. Further, a second magnet 134 is mounted on the lower surface of a portion of the plate support member 130 between the plate support portion 132 and the above elastic contact portion kept in elastic contact with the front end portion of the slide member 110.

Referring to FIG. 13, there is shown a chucking plate 150 formed of a magnetic metal material. The chucking plate 150 is composed of a substantially circular chucking portion 151, a shaft portion 152 projecting upward from the center of the chucking portion 151, and a small circular suspended portion 153 provided on the upper end of the shaft portion 152. The chucking portion 151 is formed with a central engaging portion 151*a* projecting downward. The central engaging portion 151*a* has a frustoconical shape such that the outer diameter of the central engaging portion 151*a* gradually decreases toward the lower side. Further, the axial length of the shaft portion 152 is larger than the thickness of the plate support portion 132 of the plate support member 130, and the diameter of the shaft portion 152 is smaller than the diameter of the support hole 132*a* of the plate support portion 132.

The chucking plate 150 is supported to the plate support portion 132 of the plate support member 130 in such a manner that the shaft portion 152 is inserted through the support hole 132*a* of the plate support portion 132 so as to be vertically movable and tiltable, and that the suspended portion 153 is supported on the upper surface of the plate support portion 132 in the periphery of the support hole 132*a*. In the condition where the support slider 200 is located at the front end of its movable range, the chucking plate 150 is located so as to be exposed to the plate exposure hole 41*a* of the front plate 40, so that the chucking plate 150 can be visibly recognized from the upper side through the plate exposure hole 41*a*.

Figure 15:
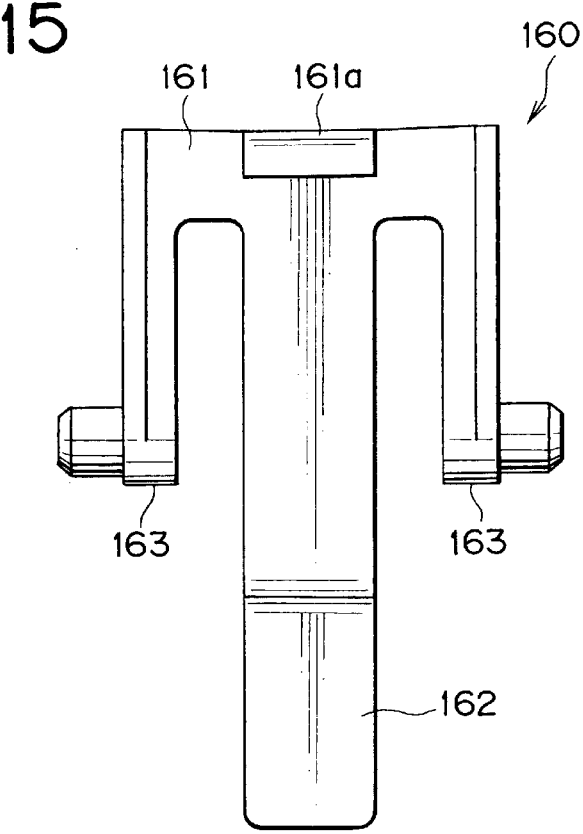
FIG. 15 is an enlarged plan view showing a sensor member.
Figure 16:
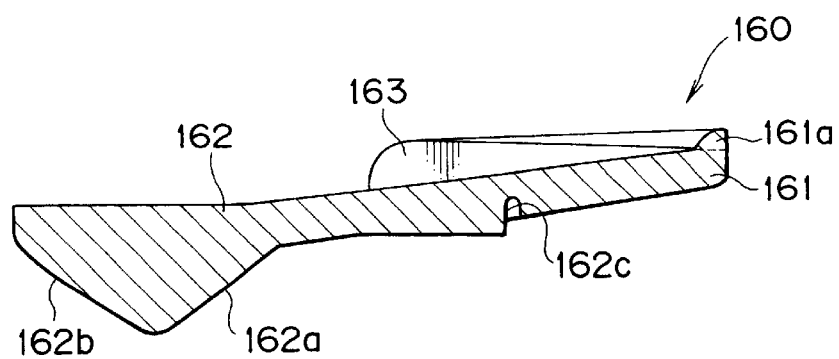
FIG. 16 is an enlarged longitudinally sectional view of the sensor member.

Referring to FIGS. 15 and 16, there is shown a sensor member 160. The sensor member 160 is integrally formed with a joint portion 161, a sensing portion 162, and a pair of supported portions 163. The joint portion 161 extends laterally and is formed at its lateral center with a restricted portion 161*a* projecting upward. The sensing portion 162 projects frontward from the lateral center of the joint portion 161. As shown in FIG. 16, a sliding contact portion 162*a* is formed at a front end portion of the sensing portion 162 so as to project downward. The sliding contact portion 162*a* has a front inclined surface 162*b* inclined downward toward the rear side of the sensor member 160.

The supported portions 163 project frontward from the lateral opposite ends of the joint portion 161. The supported portions 163 are pivotably supported at their front ends to the second support portions 115 of the slide member 110. The lower surface of the sensing portion 162 is formed with a recess 162*c* at a position behind the front ends of the supported portions 163, and the first spring portion 122 of the leaf spring member 120 is in elastic contact with the recess 162*c* of the sensing portion 162 from the lower side thereof. Accordingly, a biasing force having a direction of lowering the sliding contact portion 162*a* of the sensing portion 162 is applied to the sensor member 160 by the first spring portion 122 of the leaf spring member 120, and the restricted portion 161*a* of the sensor member 160 is located in proximity to or in contact with the stopper tab 35*b* of the support plate 30.

As shown in FIGS. 17 and 18, a pair of substantially L-shaped link levers 170 are pivotably supported to the lower surface of the support plate 30 near its front end. A fulcrum 170*a* is formed at one end portion of each link lever 170, and an engaging pin 170*b* is formed at the other end portion of each link lever 170. The engaging pins 170*b* of the link levers 170 are slidably engaged with the slide holes 111*a* of the slide member 110, respectively. Accordingly, the link levers 170 are pivotally moved in concert with the sliding operation of the support slider 200, and the engaging pins 170*b* are slid in the slide holes 111*a*.

Each link lever 170 is formed with a spring retainer pin 170*c*, and a toggle spring 180 is interposed between the spring retainer pin 170*c* of each link lever 170 and a part of the lower surface of the support plate 30. Each toggle spring 180 is reversible in its direction of biasing force. That is, when the support slider 200 is located on the front side of a given reference position, the support slider 200 is biased frontward by the toggle springs 180 through the link levers 170, whereas when the support slider 200 is located on the rear side of the given reference position, the support slider 200 is biased rearward by the toggle springs 180 through the link levers 170.

The spring retainer pins 170*c* of the link levers 170 are slidably engaged with the guide holes 31*e* and 31*f* of the support plate 30, respectively, so as to project upward therefrom. An operation ring 171 is mounted on the outer circumference of the right spring retainer pin 170*c* at its upper end portion. The operation ring 171 serves as an operated portion to be pushed by the second push portion 63 of the eject lever 60 in the eject operation.

Figure 26:
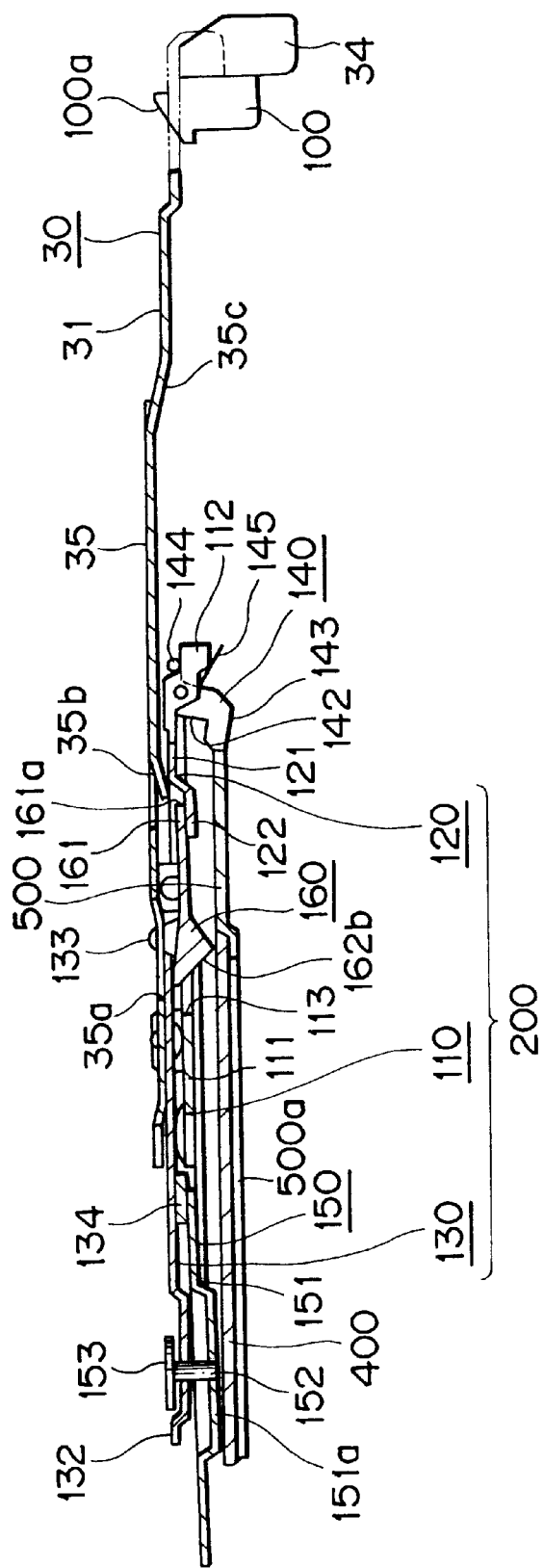
FIG. 26 is a longitudinally sectional view showing a condition where a disk having a diameter of about 8 cm mounted on a disk adapter is inserted.

The disk recording and/or reproducing device 1 can record and/or reproduce a signal both on a disk 300 having a diameter of about 12 cm and on a disk 400 having a diameter of about 8 cm. In the case of using the disk 400, the disk 400 is mounted on a disk adapter 500 and is inserted from the disk insert/eject slot 2*a*. The disk adapter 500 is annular in shape so as to have a central opening 500*a*. In the condition where the disk 400 is mounted on the disk adapter 500, a recording surface of the disk 400 is exposed to the central opening 500*a* of the disk adapter 500 (see FIG. 26).

The opening/closing operation of the shutter member 80 will now be described.

When the disk 300 is inserted from the disk insert/eject slot 2*a* and then chucked by the chucking plate 150 and the disk table 13, the shutter member 80 is pivotally moved downward to close the disk insert/eject slot 2*a* by the closing portion 81 of the shutter member 80. When the sliding knob 5 is operated to a moving end in the direction Al shown in FIGS. 1 to 3 in the chucked condition of the disk 300, the disk 300 is unchucked. At the same time, the shutter member 80 is pivotally moved upward to open the disk insert/eject slot 2*a*, and the disk 300 is ejected by a given amount from the disk insert/eject slot 2*a*. Even after the ejected disk 300 is withdrawn from the disk insert/eject slot 2*a* by the operator, the shutter member 80 is not moved and the disk insert/eject slot 2*a* is maintained open.

Accordingly, after withdrawing the disk 300 from the disk insert/eject slot 2*a*, another disk can be immediately inserted from the disk insert/eject slot 2*a* because it is maintained open.

In the case of not inserting another disk from the disk insert/eject slot 2*a* after withdrawing the disk 300, the push button 7 provided on the housing 2 may be depressed by the operator to thereby pivotally move the shutter member 80 downward and close the disk insert/eject slot 2a by the closing portion 81. Accordingly, it is possible to prevent the entry of dust or the like from the disk insert/eject slot 2a into the housing 2.

Figure 2:
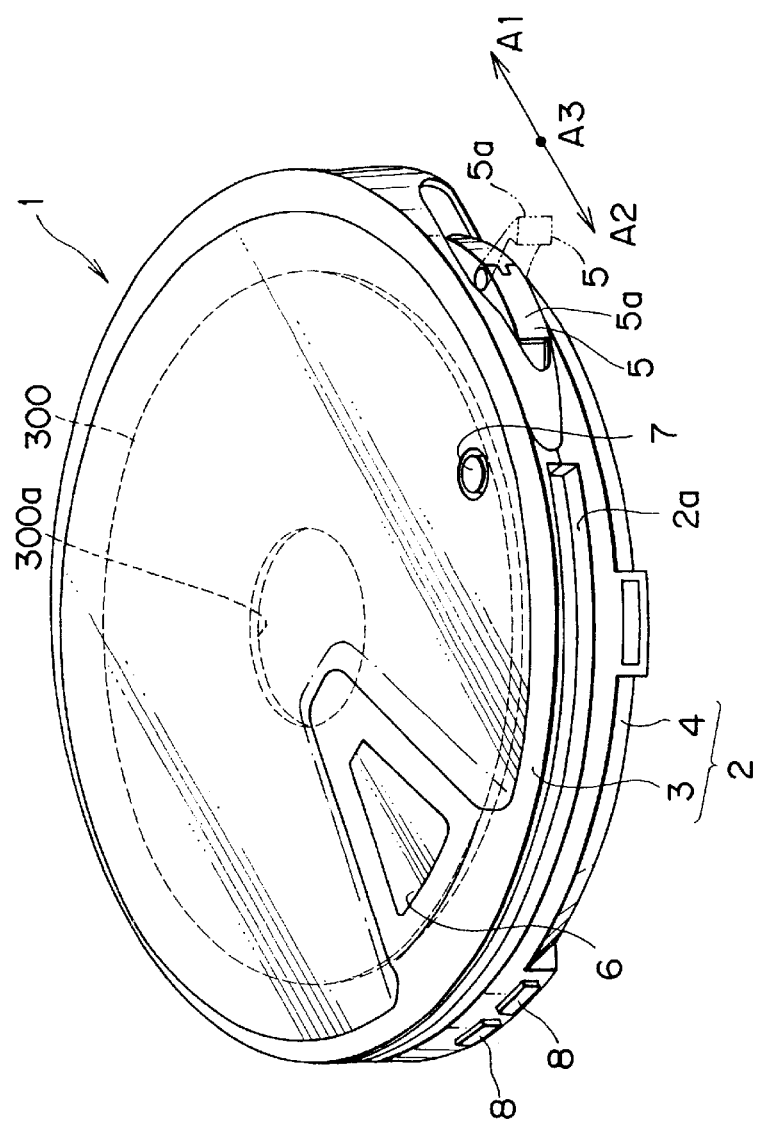
FIG. 2 is a view similar to FIG. 1, showing a condition where a disk is loaded.

When the sliding knob 5 is operated to a position A3 in the direction of the arrow A1 shown in FIGS. 1 to 3 in the condition where the disk insert/eject slot 2a is closed by the closing portion 81, the shutter member 80 is pivotally moved upward to open the disk insert/eject slot 2a. Accordingly, the disk 300 can be inserted from the disk insert/eject slot 2a into the housing 2.

While the opening/closing operation of the shutter member 80 has been described for the disk 300, a similar operation is adapted to the case of inserting or ejecting the disk 400 mounted on the disk adapter 500 rather than the disk 300.

The loading operation of the disk recording and/or reproducing device 1 will now be described with reference to FIGS. 18 to 27.

In the condition prior to starting the loading operation, the support slider 200 is located at the front end of its movable range, and the supported shafts 116, 118, and 119 of the slide member 110 are located at the front ends of the first guide hole 31b, the second guide hole 31c, and the third guide hole 31d of the support plate 30, respectively (see FIG. 18). Further, the sensor member 160 receives a biasing force of the first spring portion 122 of the leaf spring member 120 in such a direction that the sliding contact portion 162a of the sensor member 160 is lowered, and the rear surface of the restricted portion 161a of the sensor member 160 is located in proximity to or in contact with the stopper tab 35b of the support plate 30 (see FIG. 19).

In the condition where the support slider 200 is located at the front end of the movable range, the chucking plate 150 is kept in a loading standby position where the start of disk loading is allowed. In this loading standby position, the front end of the chucking portion 151 is magnetically attracted to the first magnet 50 provided on the front end portion of the main portion 41, so that the chucking portion 151 is kept in an inclined condition such that it is inclined upward toward the front side (see FIG. 19). The chucking plate 150 in the loading standby position is exposed to the window 6 provided in the upper portion 3 of the housing 2, so that the chucking plate 150 can be visibly recognized from the outside of the housing 2 through the window 6 (see FIG. 1).

Figure 20:
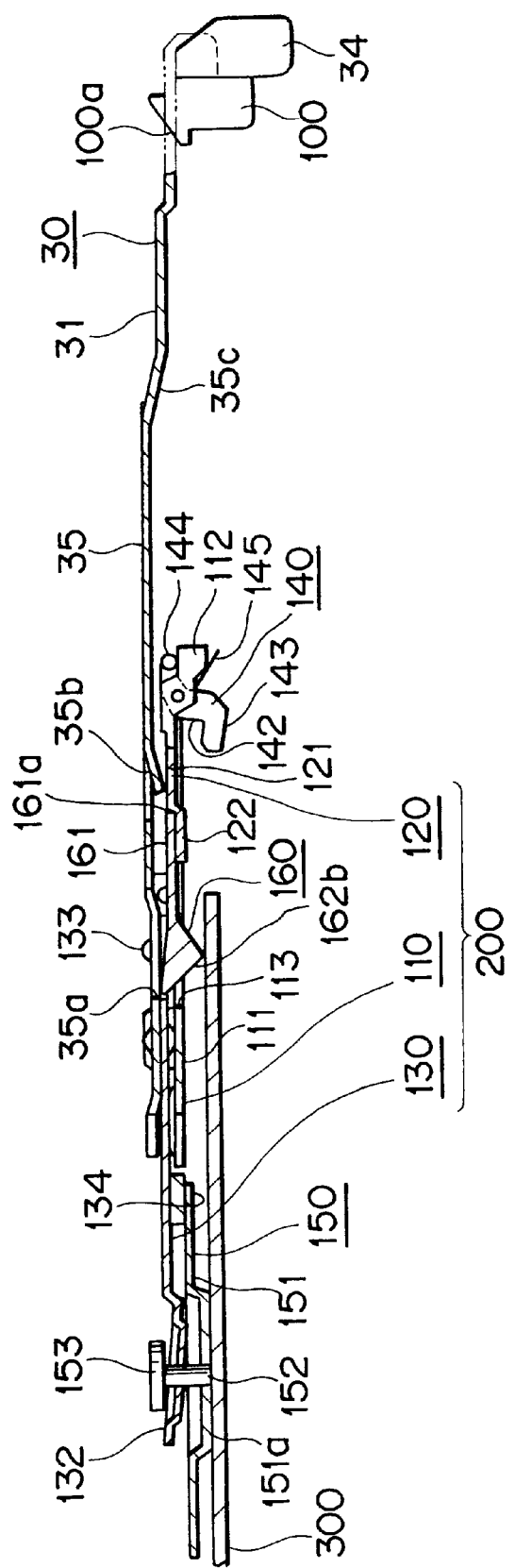
FIG. 20 is a longitudinally sectional view showing a condition where the sensor member is pivotally moved by a disk inserted.

When the disk 300 is inserted from the disk insert/eject slot 2a into the housing 2, the inclined chucking portion 151 of the chucking plate 150 is pushed by the disk 300, and the chucking portion 151 is separated from the first magnet 50 against its magnetic force, so that the chucking portion 151 becomes substantially horizontal in position (see FIG. 20). During the insertion of the disk 300, the chucking plate 150 is relatively put onto the upper surface of the disk 300 and relatively slides thereon. Prior to the insertion of the disk 300, the chucking portion 151 is kept inclined upward to the front side by the first magnet 50. Accordingly, there is no possibility of interference of the disk 300 and the chucking plate 150 when inserting the disk 300, thus ensuring smooth insertion of the disk 300 from the disk insert/eject slot 2a into the housing 2.

Furthermore, the lower surface of the disk 300 inserted comes into rolling contact with the rollers 99a rotatably supported to the lift member 97, so that the insertion of the disk 300 into the housing 2 can be made smoother.

During further insertion of the disk 300, the disk 300 is moved under the slide member 110 to come into sliding contact with the inclined surface 162b of the sensor member 160. Accordingly, the sensor member 160 is pivotally moved against the biasing force of the leaf spring member 120 so that the sliding contact portion 162a is raised. As a result, the restricted portion 161a of the sensor member 160 is lowered to a position below the stopper tab 35b of the support plate 30, thereby obtaining a condition that the support slider 200 is movable rearward (see FIG. 20).

Figure 21:
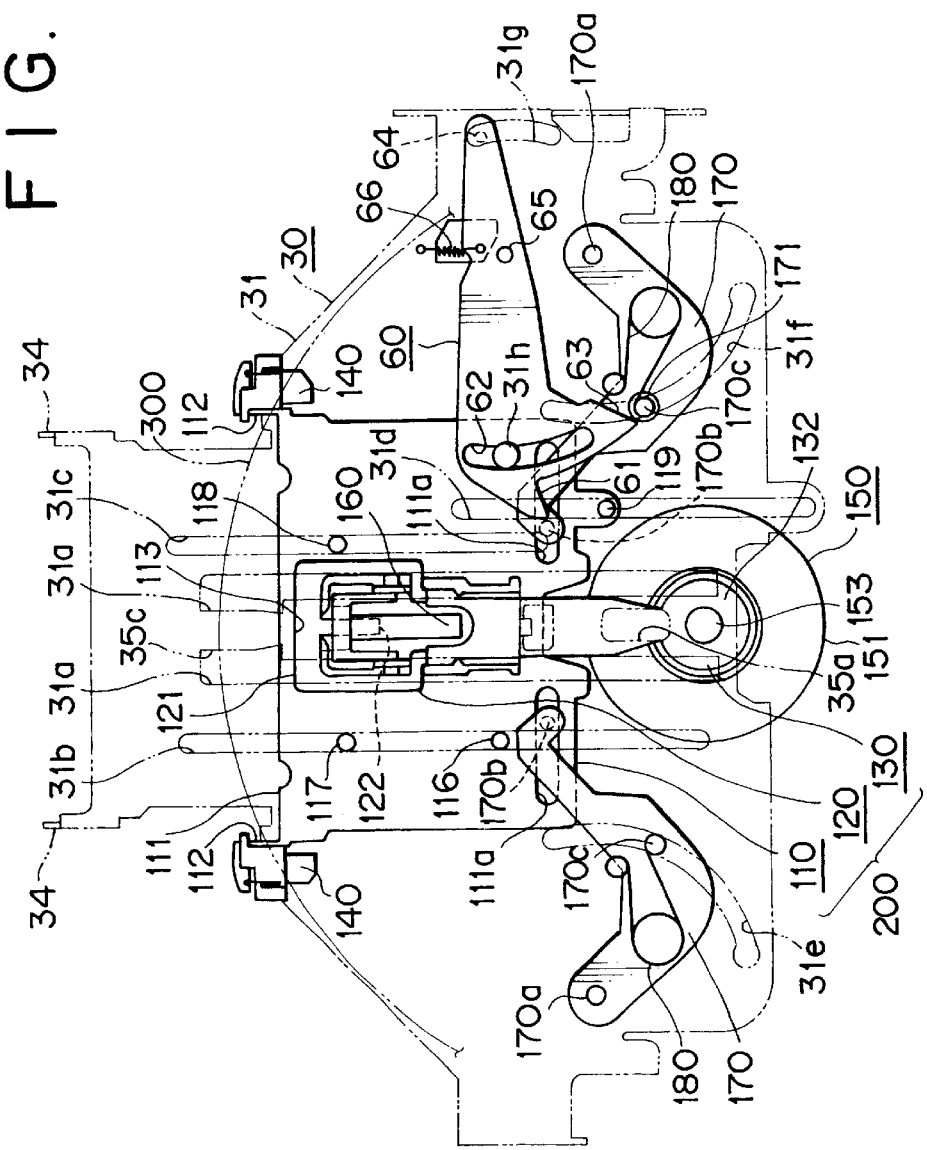
FIG. 21 is a plan view showing a condition where the support slider is moved to make contact of the eject lever and an operation ring.

When the disk 300 is further inserted, the outer circumference of the disk 300 comes into abutment against the stopper portions 142 of the holding members 140 supported to the support/engage portions 112 of the slide member 110, and is held on the receiving portions 143 (see FIG. 21). At this time, the engaging portion 151a of the chucking plate 150 is brought into engagement with a center hole 300a of the disk 300, because a downward biasing force is applied to the chucking plate 150 through the plate support member 130 by the second spring portions 124 of the leaf spring member 120. Accordingly, the engaging portion 151a functions as a disk engaging portion adapted to engage the center hole 300a of the disk 300.

Figure 22:
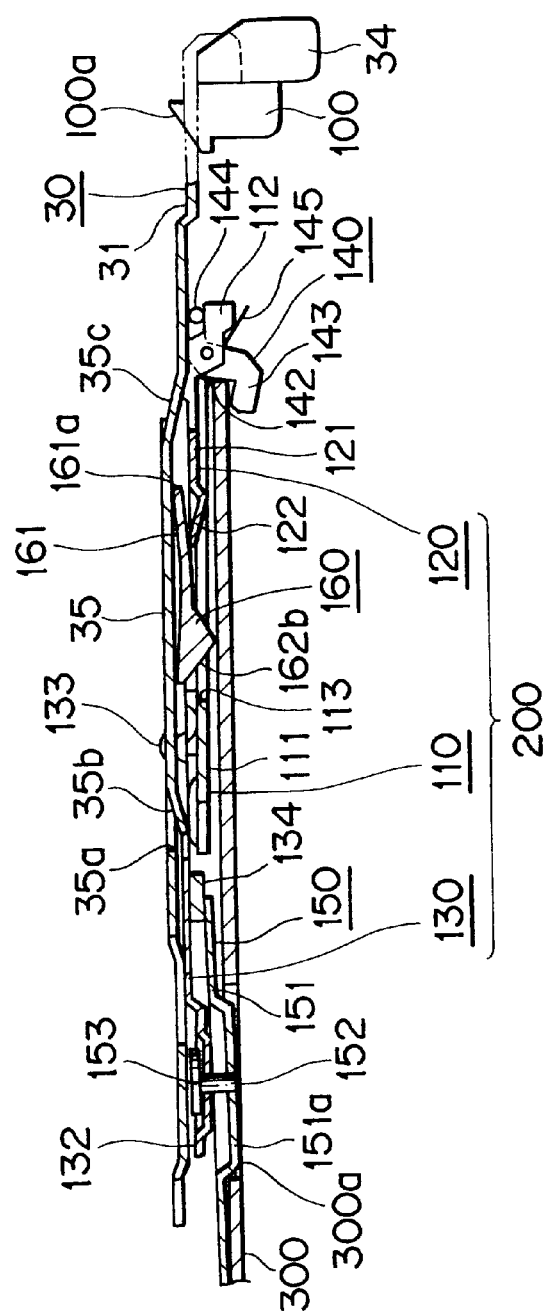
FIG. 22 is a longitudinally sectional view showing a condition where the support slider is in its movable range.
Figure 23:
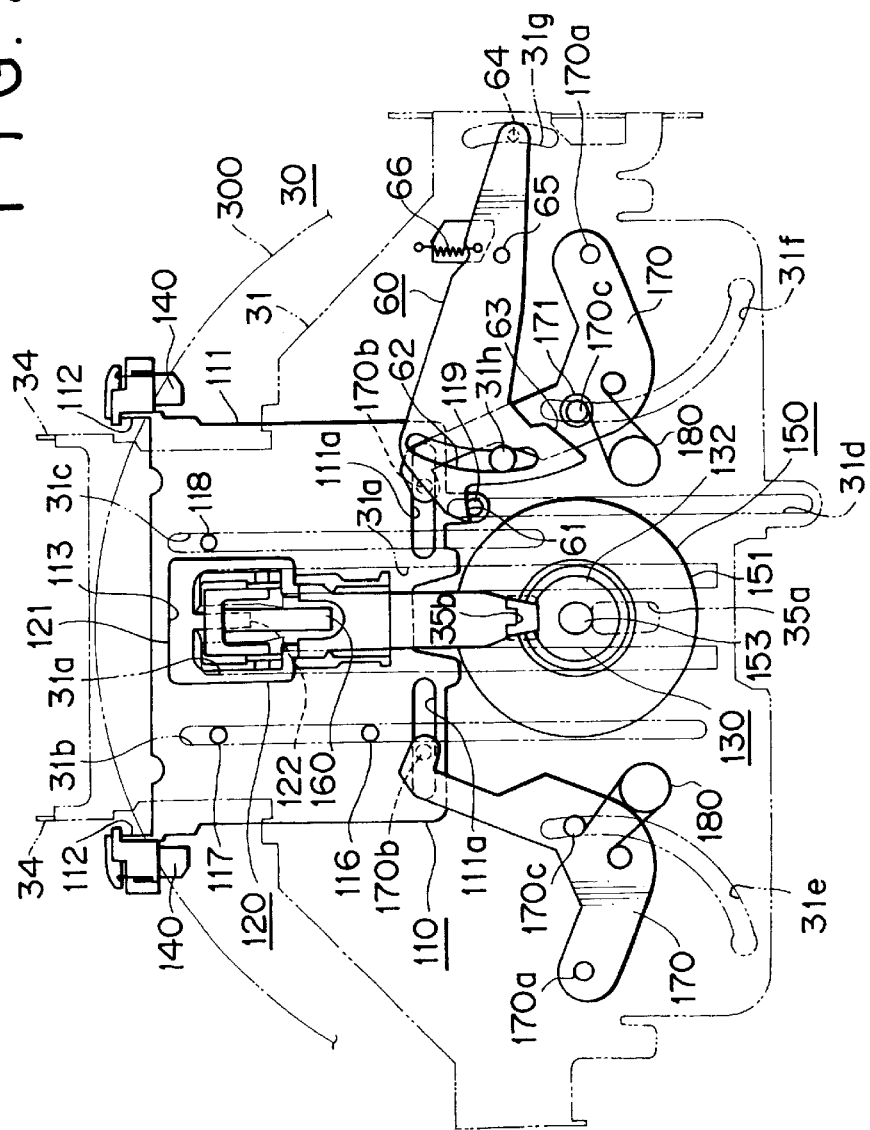
FIG. 23 is a plan view showing a condition where the support slider is located near the rear end of the movable range.

When the disk 300 is further inserted in the condition where the outer circumference of the disk 300 is held on the receiving portions 143 of the holding members 140, the stopper portions 142 of the holding members 140 are pushed by the disk 300 to rearward move the support slider 200 (see FIG. 22). The disk 300 is also moved rearward in the condition where the engaging portion 151a of the chucking plate 150 is engaged with the center hole 300a of the disk 300. At this time, the second spring portions 124 of the leaf spring member 120 are in elastic contact with the spring contact portions 133 of the plate support member 130 from its lower side. Accordingly, the spring contact portions 133 are in contact with the lower surface of the longitudinally extending portion 35 of the support plate 30, and the plate support member 130 and the chucking plate 150 are kept in their substantially horizontal condition during the rearward movement.

During the rearward movement of the support slider 200, the link levers 170 are pivotally moved against the frontward biasing forces of the toggle springs 180 (see FIG. 21). At this time, the engaging pins 170b of the link levers 170 are moved in the slide holes 111a of the slide member 110, and the spring retainer pins 170c of the link levers 170 are moved in the guide holes 31e and 31f.

By the movement of the right spring retainer pin 170c in the right guide hole 31f, the operation ring 171 mounted on the right spring retainer pin 170c is also moved along the guide hole 31f to come into contact with the second push portion 63 of the eject lever 60 and push it (see FIG. 21). Accordingly, the eject lever 60 is pivotally moved so that the first push portion 61 of the eject lever 60 is moved rearward and that the operated shaft 64 of the eject lever 60 is moved frontward along the insertion hole 31g of the support plate 30.

When the support slider 200 being moved rearward in concert with the insertion of the disk 300 reaches a given reference position, the toggle springs 180 are reversed in their directions of biasing forces. Accordingly, the rearward biasing forces of the toggle springs 180 are now applied to the support slider 200 through the link levers 170. Thus, the support slider 200 is moved rearward by the biasing forces of the toggle springs 180 after passing the given reference position. As a result, the disk 300 engaged at its center hole 300a with the engaging portion 151a of the chucking plate 150 is automatically drawn into the housing 2.

When the support slider 200 is further moved rearward from the given reference position to reach a position near the rear end of the movable range, the elastic contact portions 144 of the holding members 140 mounted on the support/engage portions 112 of the slide member 110 come into abutment against the lower end portions of the inclined surfaces 100a of the release members 100 mounted on the support portions 34 of the support plate 30.

When the support slider 200 is further moved rearward from this position, the elastic contact portions 144 slide on the inclined surfaces 100a, and the holding members 140 are pivotally moved against the spring forces of the torsion coil springs 145 so that the front ends of the receiving portions 143 are lowered. When the support slider 200 reaches the rear end of the movable range, i.e., when the chucking plate 150 supported to the plate support member 130 reaches a chucking standby position, the disk 300 is released from the holding members 140 (see FIG. 25).

At the same time, the interposed lever 73 of the operating mechanism 70 is pushed to be moved by the frontward moving operated shaft 64 of the eject lever 60. Accordingly, the interlocking mechanism provided on the second support member 96 is operated to pivotally move the holder 90 so that the front ends of the holder 90 are lowered. In concert with the pivotal movement of the holder 90, the first and second support members 95 and 96 are synchronously lowered, and accordingly the lift member 97 is pivotally moved so that its rear end is lowered.

As described above, at the rear end of the movable range of the support slider 200, the disk 300 is released from the holding members 140, and the first and second support members 95 and 96 are synchronously lowered to pivotally move the lift member 97 so that its rear end is lowered. Accordingly, the disk 300 is lowered and its center hole 300a comes into engagement with the centering portion 13b of the disk table 13.

Figure 25:
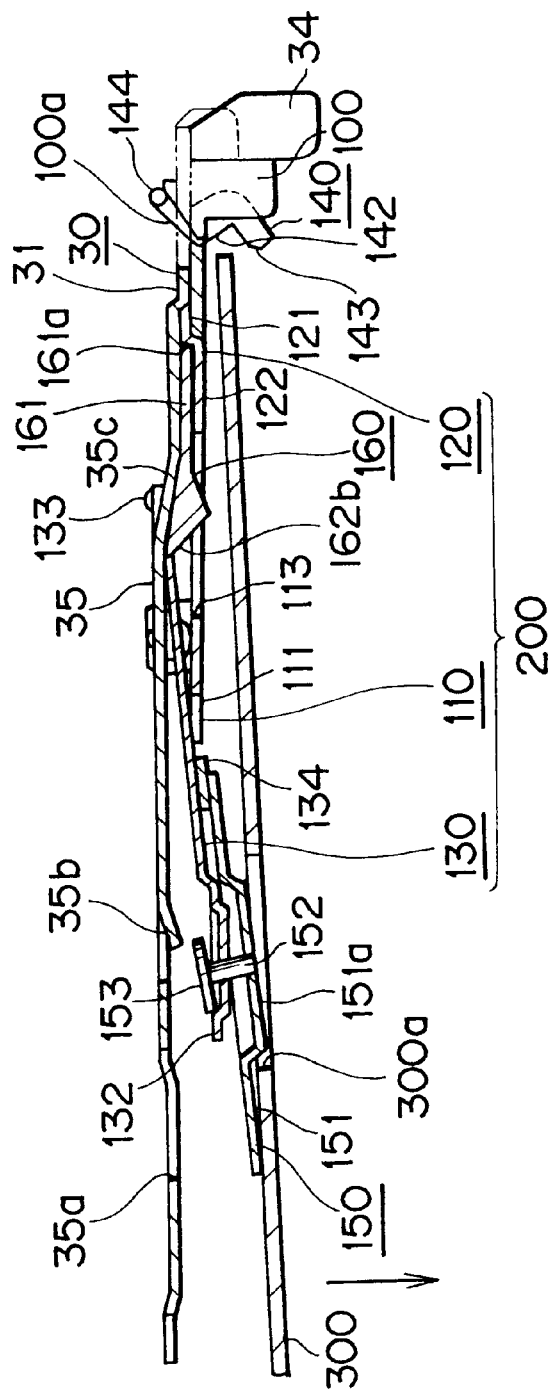
FIG. 25 is a longitudinally sectional view showing the condition of FIG. 24.

Further, at the rear end of the movable range of the support slider 200, the spring contact portions 133 of the plate support member 130 come to a position corresponding to the narrow portion 35c of the longitudinally extending portion 35 of the support plate 30 and project upward from the narrow portion 35c, and the plate support member 130 is pivotally moved so that its front end portion is lowered by the spring forces of the second spring portions 124 of the leaf spring member 120 (see FIG. 25). Accordingly, the chucking plate 150 is lowered to be magnetically attracted to the magnet embedded in the disk table 13 with the disk 300 sandwiched therebetween. That is, the disk 300 is chucked by the disk table 13 and the chucking plate 150, thus completing the loading operation for the disk 300. As previously mentioned, when the disk 300 is chucked by the disk table 13 and the chucking plate 150, the shutter member 80 is pivotally lowered to close the disk insert/eject slot 2a by the closing portion 81 of the shutter member 80.

In the above condition that the support slider 200 has reached the rear end of the movable range and the disk 300 has been chucked, the chucking plate 150 cannot be visibly recognized through the window 6 from the outside of the housing 2 (see FIG. 2). Accordingly, it is possible to determine whether or not the disk 300 is present in the housing 2 by confirming the visibility of the chucking plate 150 through the window 6. That is, the presence or absence of the disk 300 in the housing 2 can be determined reliably and easily as compared with the case that it is determined by determining whether or not the disk 300 having a flat smooth surface can be visibly recognized through the window 6.

When the operating switch 8 for reproduction, which is provided on the lower portion 4 of the housing 2, is operated after completing the loading operation for the disk 300, the spindle motor 11 is started to rotate the disk table 13 and thereby rotate the disk 300 chucked by the disk table 13 and the chucking plate 150. At the same time, the optical pickup 12 is operated to reproduce information recorded on the disk 300.

When the other operating switch 8 for stop, which is provided on the lower portion 4 of the housing 2, is operated during the reproducing operation, the spindle motor 11 is stopped to stop the rotation of the disk 300. At the same time, the operation of the optical pickup 12 is also stopped to end the reproducing operation.

When the sliding knob 5 provided on the housing 2 is operated in the direction A1 after ending the reproducing operation, the disk 300 is unchucked to start the eject operation. At the same time, the shutter member 80 is pivotally moved upward to open the disk insert/eject slot 2a closed by the closing portion 81.

The eject operation for the disk 300 will now be described in more detail. When the sliding knob 5 is operated, the operating lever 71 is moved to operate the operating mechanism 70, so that the holder 90 is pivotally moved in such a manner that its front ends are raised. In concert with the pivotal movement of the holder 90, the first and second support members 95 and 96 are synchronously raised, so that the lift member 97 is pivotally moved in such a manner that its rear end is raised. Accordingly, the disk 300 chucked is raised by the first and second support members 95 and 96 and the lift member 97 to thereby unchuck the disk 300 from the disk table 13 and the chucking plate 150. That is, the disk 300 is raised together with the chucking plate 150 to maintain the condition that the engaging portion 151a of the chucking plate 150 is engaged with the center hole 300a of the disk 300.

By the rearward movement of the operating lever 71, the pushed portion 73a of the interposed lever 73 is pushed rearward by the push portion 71a of the operating lever 71, so that the operated shaft 64 of the eject lever 60 is pushed rearward by the interposed lever 73. Accordingly, the eject lever 60 is pivotally moved in such a manner that the first push portion 61 is moved frontward.

Figure 24:
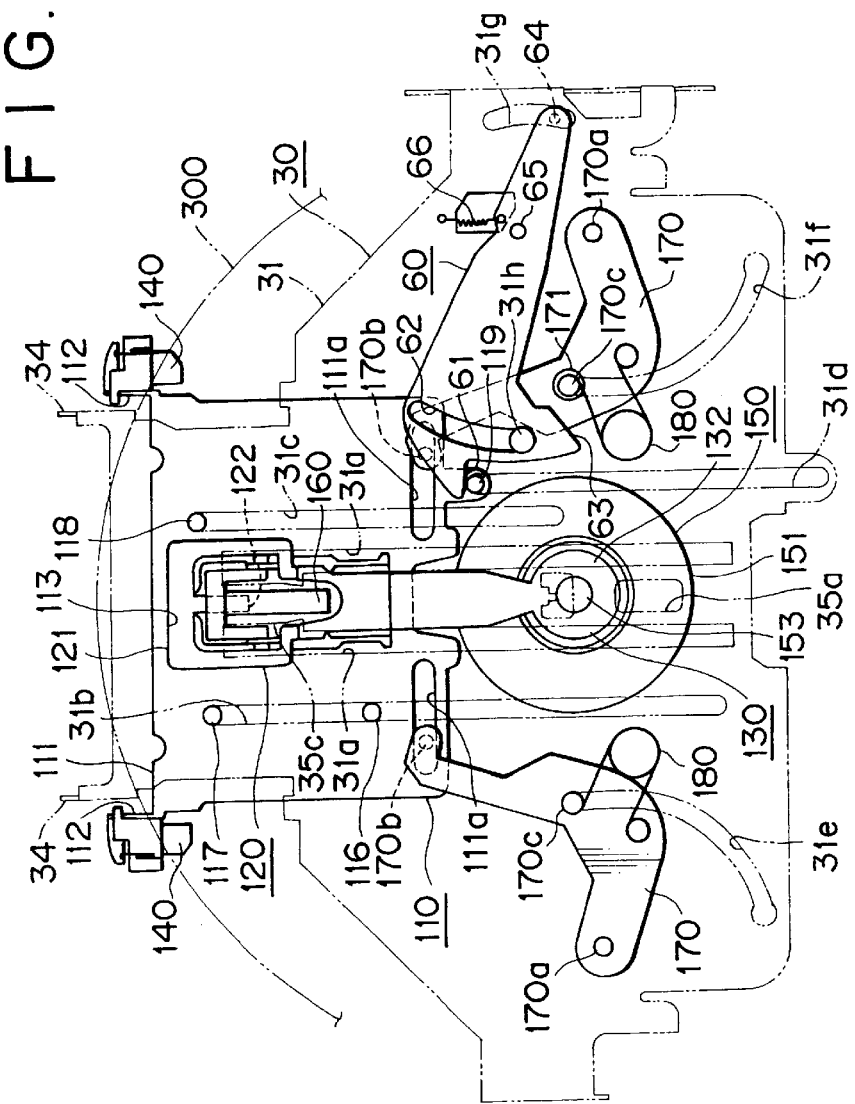
FIG. 24 is a plan view showing a condition where the support slider is located at the rear end of the movable range.

At the rear end of the movable range of the support slider 200, i.e., at the chucking standby position of the chucking plate 150 supported to the plate support member 130, the supported shaft 119 of the slide member 110 is in abutment against the first push portion 61 of the eject lever 60 (see FIG. 24). Further, in this condition, the operation ring 171 mounted on the spring retainer pin 170c of the right link lever 170 is not in abutment against the second push portion 63 of the eject lever 60, but is proximity thereto (see FIG. 24). Accordingly, in concert with the pivotal movement of the eject lever 60 by the movement of the operating lever 71, the supported shaft 119 is pushed frontward by the first push portion 61 to move the support slider 200 frontward (see FIG. 23). Accordingly, the disk 300 is smoothly moved frontward in rolling contact with the rollers 99a supported to the lift member 97.

When the support slider 200 is moved frontward, the elastic contact portions 144 of the holding members 140 are lowered along the inclined surfaces 100a of the release members 100, and the holding members 140 are pivotally moved by the spring forces of the torsion coil springs 145 to hold the disk 300. Further, the spring contact portions 133 of the plate support member 130 projected upward from the narrow portion 35c of the support plate 30 come again into contact with the lower surface of the longitudinally extending portion 35, so that the plate support member 130 and the chucking plate 150 become substantially horizontal.

During the frontward movement of the support slider 200 together with the disk 300 by the push operation of the first push portion 61 of the eject lever 60 against the supported shaft 119, the second push portion 63 of the eject lever 60 comes into abutment against the operation ring 171, and the first push portion 61 is separated from the supported shaft 119 (see FIG. 21). Accordingly, when the eject lever 60 is further pivotally moved, the operation ring 171 is pushed by the second push portion 63 to further frontward move the support slider 200 through the right link lever 170.

When the support slider 200 reaches the given reference position during the frontward movement, the toggle springs 180 are reversed in their directions of biasing forces. Accordingly, the frontward biasing forces of the toggle springs 180 are applied through the link levers 170 to the support slider 200. Until the support slider 200 is moved to a position slightly frontward from the given reference position, the operation ring 171 is pushed frontward by the second push portion 63.

Thus, the operation ring 171 is pushed by the second push portion 63 of the eject lever 60 until the support slider 200 pushed to be moved by the first push portion 61 of the eject lever 60 is moved to a position frontward from the given reference position. Accordingly, the toggle springs 180 can be reliably inverted by the second push portion 63 rather than by the dead band of the toggle springs 180, thereby applying a frontward moving force to the support slider 200. Accordingly, the disk 300 can be reliably ejected.

In the case that the toggle springs 180 are inverted by the pressure of the first push portion 61 only, the length of the eject lever 60 must be increased to continue to push the supported shaft 119 until the toggle springs 180 are inverted. According to this preferred embodiment, however, when the eject lever 60 is pivotally moved to a given position, the push operation of the first push portion 61 is changed to the push operation of the second push portion 63. With this structure, the eject lever 60 can be reduced in length, thereby realizing a reduction in size and an improvement in degree of freedom of design of the disk recording and/or reproducing device 1.

After the toggle springs 180 are inverted, the support slider 200 is moved frontward by the biasing forces of the toggle springs 180 to thereby automatically eject from the disk insert/eject slot 2a the disk 300 whose center hole 300a is engaged with the engaging portion 151a of the chucking plate 150.

When the support slider 200 is moved to the front end of the movable range, the eject operation for the disk 300 is completed. In this condition, the disk 300 is ejected by a given amount from the disk insert/eject slot 2a. By withdrawing the disk 300 ejected from the disk insert/eject slot 2a, the disk 300 can be removed from the housing 2.

In the above condition where the disk 300 is ejected by a given amount from the disk insert/eject slot 2a, the center hole 300a of the disk 300 is engaged with the engaging portion 151a of the chucking plate 150. Accordingly, there is no possibility that the whole of the disk 300 may jump out of the disk insert/eject slot 2a. Further, even in the case that the disk insert/eject slot 2a is oriented downward in the ejected condition of the disk 300, there is no possibility that the disk 300 may fall down.

Further, in the condition where the eject operation has been completed after the frontward movement of the chucking plate 150, the chucking plate 150 is located at the front end portion in the housing 2. Accordingly, in this eject operation completed condition, the disk 300 is ejected always by a given amount from the disk insert/eject slot 2a, and this given amount of ejection is large, so that it is possible to improve the operability of the disk recording and/or reproducing device 1.

In the disk recording and/or reproducing device 1, the loading operation and the eject operation are performed by moving the chucking plate 150. The chucking plate 150 and the plate support member 130 for supporting the chucking plate 150 are arranged in the radial direction of the disk 300 in spaced relationship. Accordingly, the disk recording and/or reproducing device 1 can be reduced in thickness.

In addition, when the disk 300 is inserted from the disk insert/eject slot 2a, the engaging portion 151a of the chucking plate 150 rest in its loading standby position comes into engagement with the center hole 300a of the disk 300. Accordingly, there is no possibility of misalignment between the disk 300 and the chucking plate 150 due to vibrations or the like, so that a proper chucking operation for the disk 300 can be performed.

While the loading operation and the eject operation of the disk recording and/or reproducing device 1 have been described in the case of using the disk 300 having a diameter of about 12 cm, the loading operation and the eject operation for the disk 300 are similarly applicable also to the case of using the disk 400 mounted on the disk adapter 500 in place of the disk 300.

In the case that the disk 400 mounted on the disk adapter 500 is inserted from the disk insert/eject slot 2a, the disk 400 comes into sliding contact with the sliding contact portion 162a of the sensor member 160 to pivotally move the sensor member 160. In this condition, the support slider 200 is movable (see FIG. 26). In chucking the disk 400 between the disk table 13 and the chucking plate 150, the disk adapter 500 is retracted to a position not interfering with the chucking operation.

Figure 27:
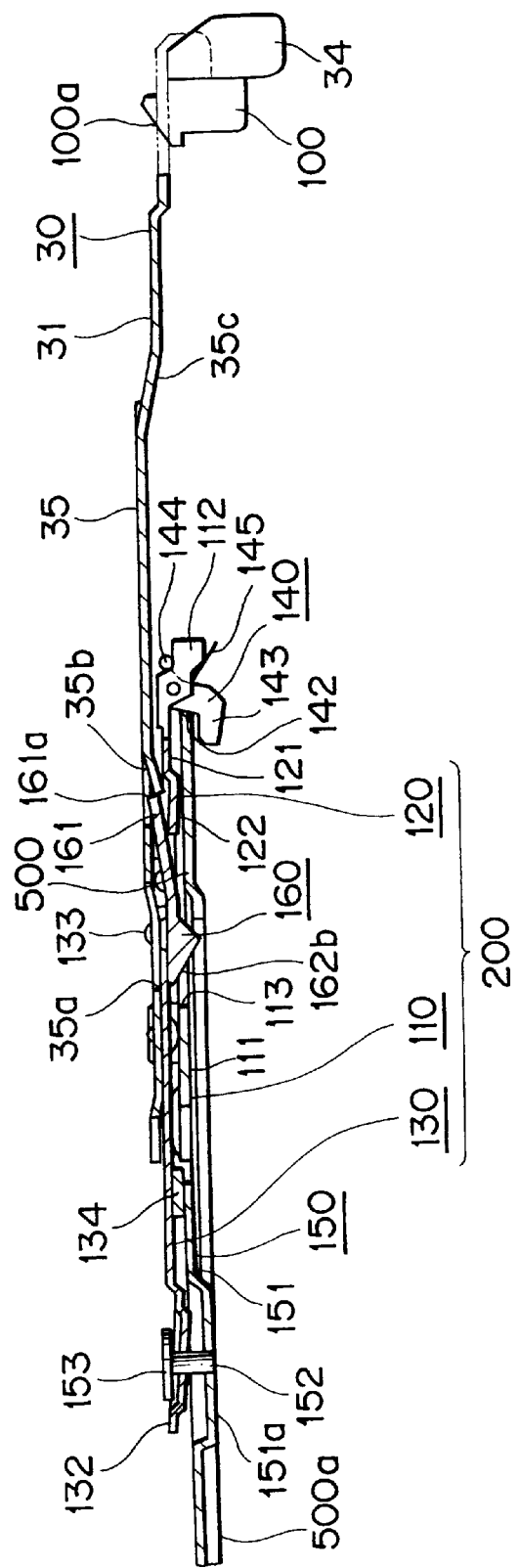
FIG. 27 is a longitudinally sectional view showing a condition where the disk adapter on which the disk shown in FIG. 26 is not mounted is inserted.

In the event that the disk adapter 500 on which the disk 400 is not mounted is erroneously inserted from the disk insert/eject slot 2a, the central opening 500a of the disk adapter 500 is exposed to the sensor member 160 (see FIG. 27). Accordingly, although the disk adapter 500 is intended to be further inserted into the housing 2, the restricted portion 161a of the sensor member 160 abuts against the stopper tab 35b of the support plate 30, thereby restricting the insertion of the disk adapter 500. Thus, the operator can determine the erroneous insertion of the disk adapter 500.

Further, also in this case that the disk adapter 500 only is erroneously inserted, the chucking plate 150 inclined by the magnetic attraction of the first magnet 50 in the loading standby position is pushed by the disk adapter 500 and then magnetically attracted to the second magnet 134 to become a substantially horizontal condition. Accordingly, when removing the erroneously inserted disk adapter 500 from the disk insert/eject slot 2a, there is no possibility of interference of the disk adapter 500 with the chucking plate 150, thereby allowing easy removal of the disk adapter 500 and preventing damages to the chucking plate 150 and the disk adapter 500.

While the disk recording and/or reproducing device 1 according to the above preferred embodiment is a device capable of only reproducing information recorded on the disk, the present invention is applicable also to a device capable of only recording information to the disk or a device capable of both recording and reproducing information with respect to the disk.

It is to be noted that the specific shapes and structures of the various portions described above in the present invention are merely illustrative, and the scope of the present invention is not limited to the above specific shapes and structures.

In the disk recording and/or reproducing device of the present invention, the disk is moved with the chucking plate in the condition where the disk is engaged with the chucking plate. The loading operation is performed by moving the chucking plate. The chucking plate and the support portion for supporting the chucking plate are arranged in the radial direction of the disk in spaced relationship. Accordingly, the disk recording and/or reproducing device can be reduced in thickness.

Further, in this disk recording and/or reproducing device, the chucking plate rest in its loading standby position is engaged with the disk at starting the disk loading. Accordingly, there is no possibility of misalignment between the disk and the chucking plate due to vibrations or the like, so that a proper chucking operation for the disk can be performed.

Still further, in this disk recording and/or reproducing device, the presence or absence of the disk in the housing can be determined by determining whether or not the chucking plate can be visibly recognized through the window from the outside of the housing. Accordingly, as compared with the case that the presence or absence of the disk in the housing is determined by determining whether or not the disk having a flat smooth surface can be visibly recognized through the window from the outside of the housing, the determination of the presence or absence of the disk can be effected reliably and easily.

In the disk loading mechanism of the present invention, the disk is moved with the chucking plate in the condition where the disk is engaged with the chucking plate. The loading operation is performed by moving the chucking plate. The chucking plate and the support portion for supporting the chucking plate are arranged in the radial direction of the disk in spaced relationship. Accordingly, the disk recording and/or reproducing device can be reduced in thickness.

Further, in this disk loading mechanism, the chucking plate rest in its loading standby position is engaged with the disk at starting the disk loading. Accordingly, there is no possibility of misalignment between the disk and the chucking plate due to vibrations or the like, so that a proper chucking operation for the disk can be performed.

In the disk eject mechanism of the present invention, invention, the toggle spring is inverted always during the push operation by the eject lever. The toggle spring can be reliably inverted by not utilizing the dead band of the toggle spring, thereby generating a force of moving the slider in the eject direction. Accordingly, the disk can be reliably ejected.

Further, in this disk eject mechanism, the pushed portion and the operated portion are continuously pushed by the two push portions, so that the toggle spring can be inverted by the eject lever reduced in size.

What is claimed is:

1. A disk recording and/or reproducing device for recording data onto a disk and/or reproducing data recorded on said disk, the device comprising:
    a disk mounting portion for mounting said disk;
    a chucking portion for chucking said disk in cooperation with said disk mounting portion, said chucking portion having a disk engaging portion for engaging said disk at a start of a disk loading operation;
    a slider for supporting said chucking portion and for moving said chucking portion in a radial direction of said disk between a chucking position where said disk is chucked and a loading position where said disk loading operation is started; and
    a locking portion adapted to be pushed by said disk being inserted so as to cancel a restricted condition of said slider;
    wherein when said restricted condition of said slider is canceled by said locking portion, said slider is moved in a loading direction by continued insertion of said disk.

2. The disk recording and/or reproducing device according to claim 1, further comprising:
    a housing; and
    a window provided in said housing for allowing a position of said chucking portion to be visible from outside said housing.

3. The disk recording and/or reproducing device according to claim 1, wherein said chucking portion is formed of magnetic material, said disk recording and/or reproducing device further comprises a magnet for magnetically attracting said chucking portion when inserting said disk between said disk mounting portion and said chucking portion thereby spacing said chucking portion away from said disk being inserted.

4. The disk recording and/or reproducing device according to claim 1, further comprising a shutter portion for closing a disk insert/eject portion provided for insertion and ejection of said disk, in concert with chucking of said disk by said disk mounting portion and said chucking portion.

5. The disk recording and/or reproducing device according to claim 4, further comprising an operating portion causing a closing operation of said shutter portion.

6. A disk recording and/or reproducing device for recording data onto a disk and/or reproducing data recorded on said disk, the device comprising:
    a disk mounting portion for mounting said disk;
    a chucking portion for chucking said disk in cooperation with said disk mounting portion, said chucking portion having a disk engaging portion for engaging said disk at a start of a disk loading operation;
    a slider for supporting said chucking portion and for moving said chucking portion in a radial direction of said disk between a chucking position where said disk is chucked and a loading position where said disk loading operation is started; and
    a link lever engaged with said slider and adapted to be pivotally moved in concert with movement of said slider in a loading direction and having a toggle spring for biasing said slider through an engaged portion of said link lever with said slider, wherein when said slider is moved to a predetermined position in said loading direction, said toggle spring is inverted in a biasing direction from an eject direction to said loading direction.

7. The disk recording and/or reproducing device according to claim 6, further comprising:
    a housing; and
    a window provided in said housing for allowing a position of said chucking portion to be visible from outside said housing.

8. The disk recording and/or reproducing device according to claim 6, wherein said chucking portion is formed of magnetic material, said disk recording and/or reproducing device further comprises a magnet for magnetically attracting said chucking portion when inserting said disk between said disk mounting portion and said chucking portion, thereby spacing said chucking portion away from said disk being inserted.

9. The disk recording and/or reproducing device according to claim 6, further comprising a shutter portion for closing a disk insert/eject portion provided for insertion and ejection of said disk, in concert with chucking of said disk by said disk mounting portion and said chucking portion.

10. The disk recording and/or reproducing device according to claim 9, further comprising an operating portion causing a closing operation of said shutter portion.

11. A disk eject mechanism for ejecting a disk having already been mounted in a device, comprising:

an eject lever adapted to be operated in a predetermined direction according to an eject instruction by a user of the device, said eject lever having a first push portion and a second push portion; and a slider adapted to be pushed by said first push portion of said eject lever and thereby moved in an eject direction in concert with operation of said eject lever in said predetermined direction to a predetermined position, and said slider being adapted to be released from said first push portion after passing said predetermined position upon operation of said eject lever and to be pushed by said second push portion, thereby being further moved in said eject direction.

12. The disk eject mechanism according to claim 11, wherein said eject lever is pivotally moved according to said eject instruction by said user, and said slider is pushed by said first push portion to slide in said eject direction in concert with pivotal movement of said eject lever to said predetermined position, and is released from said first push portion after passing said predetermined position in the pivotal movement of said eject lever and is pushed by said second push portion, thereby being further moved in said eject direction.

13. The disk eject mechanism according to claim 11, further comprising a link lever engaged with said slider and adapted to be pushed by said second push portion, thereby being pivotally moved for moving said slider in said eject direction.

14. The disk eject mechanism according to claim 11, further comprising a toggle spring adapted to bias said slider in said eject direction when said slider is in a position beyond a predetermined position relative to said eject direction, and said toggle spring is adapted to bias said slider in a loading direction opposite to said eject direction when said slider is in a position beyond said predetermined position relative to said loading direction.

15. The disk eject mechanism according to claim 11, further comprising a chucking portion supported by said slider and having a disk engaging portion adapted to engage said disk, said chucking portion being movable by movement of said slider when said disk engaging portion is engaged with said disk.

16. The disk eject mechanism according to claim 11, further comprising an operating portion adapted to be operated by said user to thereby operate said eject lever in said predetermined direction, a part of said operating portion being pivotally movable for grasping by said user, whereby said operating portion is operated by said user when said part of said operating portion is pivotally moved to be grasped by said user.

* * * * *